US008549606B2

(12) United States Patent
Saito

(10) Patent No.: US 8,549,606 B2
(45) Date of Patent: Oct. 1, 2013

(54) DEVICE FOR PROTECTING DIGITAL CONTENT, DEVICE FOR PROCESSING PROTECTED DIGITAL CONTENT, METHOD FOR PROTECTING DIGITAL CONTENT, METHOD FOR PROCESSING PROTECTED DIGITAL CONTENT, STORAGE MEDIUM STORING PROGRAM FOR PROTECTING DIGITAL CONTENT, AND STORAGE MEDIUM STORING PROGRAM FOR PROCESSING PROTECTED DIGITAL CONTENT

(75) Inventor: Kazuo Saito, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1529 days.

(21) Appl. No.: 11/259,690

(22) Filed: Oct. 26, 2005

(65) Prior Publication Data
US 2006/0288424 A1    Dec. 21, 2006

(30) Foreign Application Priority Data

Jun. 1, 2005    (JP) .................................. 2005-161201

(51) Int. Cl.
*G06F 15/16*    (2006.01)
*G06F 17/30*    (2006.01)
*H04L 9/00*    (2006.01)

(52) U.S. Cl.
USPC .............. 726/10; 726/1; 726/2; 726/3; 726/4; 726/5; 726/6; 726/7; 726/26; 726/27; 726/30; 726/32; 713/156; 713/157; 713/165; 713/171; 713/173; 713/175; 713/183; 380/200; 380/277

(58) Field of Classification Search
USPC ................................. 726/10, 2, 26; 380/277
See application file for complete search history.

(56) References Cited

U.S. PATENT DOCUMENTS

| 6,115,471 | A  | * | 9/2000  | Oki et al. ...................... 380/242 |
| 6,336,189 | B1 |   | 1/2002  | Takeda et al. |
| 6,697,944 | B1 | * | 2/2004  | Jones et al. ................... 713/168 |
| 7,062,471 | B1 | * | 6/2006  | Matsuyama et al. ............ 705/65 |
| 7,228,419 | B2 | * | 6/2007  | Iino ............................... 713/170 |
| 7,299,209 | B2 |   | 11/2007 | Collier |
| 2002/0059522 | A1 |   | 5/2002 | Hirano et al. |
| 2004/0034582 | A1 | * | 2/2004 | Gilliam et al. .................. 705/31 |

(Continued)

FOREIGN PATENT DOCUMENTS

CN    1571948    1/2005
EP    1271279    1/2003

(Continued)

OTHER PUBLICATIONS

Office Action issued on Mar. 7, 2008 from the Chinese Patent Office for corresponding Chinese Patent Application No. 2005101289931, with English translation.

(Continued)

*Primary Examiner* — Yin-Chen Shaw
*Assistant Examiner* — Jenise Jackson
(74) *Attorney, Agent, or Firm* — Gesmer Updegrove LLP

(57) ABSTRACT

There is provided a device for protecting a digital content. The device includes a digital content processing section that causes a digital content to be protected using security information; and an encrypting section that encrypts the security information, using a key acquired from a Digital Right Management system of an electronic ticket system.

45 Claims, 16 Drawing Sheets

(56) References Cited

U.S. PATENT DOCUMENTS

| | | |
|---|---|---|
| 2004/0168061 A1* | 8/2004 | Kostal et al. ............... 713/170 |
| 2004/0168073 A1 | 8/2004 | Bourne et al. |
| 2004/0186853 A1* | 9/2004 | Yamamoto et al. ........ 707/104.1 |
| 2004/0230489 A1* | 11/2004 | Goldthwaite et al. .......... 705/26 |
| 2004/0240670 A1 | 12/2004 | Man et al. |
| 2004/0255115 A1* | 12/2004 | DeMello et al. .............. 713/156 |
| 2005/0004875 A1* | 1/2005 | Kontio et al. ................... 705/52 |
| 2006/0173787 A1* | 8/2006 | Weber et al. .................... 705/59 |
| 2007/0112681 A1* | 5/2007 | Niwano et al. .................. 705/59 |
| 2008/0060081 A1* | 3/2008 | Van Den Heuvel ............. 726/27 |
| 2008/0140433 A1* | 6/2008 | Levy et al. ......................... 705/1 |
| 2008/0159527 A1* | 7/2008 | Bentley et al. .................. 380/28 |
| 2008/0215896 A1* | 9/2008 | Bourne et al. .................. 713/193 |
| 2010/0115628 A1* | 5/2010 | Li et al. ............................ 726/28 |
| 2010/0268649 A1* | 10/2010 | Roos et al. ....................... 705/50 |
| 2010/0281253 A1 | 11/2010 | Bourne et al. |
| 2011/0061107 A1* | 3/2011 | Siegel ............................. 726/26 |
| 2011/0213721 A1* | 9/2011 | Raley et al. .................... 705/310 |
| 2012/0117662 A1* | 5/2012 | Cross et al. ..................... 726/28 |

FOREIGN PATENT DOCUMENTS

| | | |
|---|---|---|
| JP | 10247905 | 9/1998 |
| JP | 11031105 | 2/1999 |
| JP | 2002152490 | 5/2002 |
| JP | 2002229660 | 8/2002 |
| JP | 2003101526 | 4/2003 |
| JP | 2004259279 | 9/2004 |
| WO | 03034193 | 4/2003 |

OTHER PUBLICATIONS

Notice of Grounds for Rejection issued in connection with corresponding Japanese Application No. JP2005-161201, mailed on Jan. 25, 2011 and English translation thereof.

* cited by examiner

DEVICE FOR PROTECTING DIGITAL CONTENT, DEVICE FOR PROCESSING PROTECTED DIGITAL CONTENT, METHOD FOR PROTECTING DIGITAL CONTENT, METHOD FOR PROCESSING PROTECTED DIGITAL CONTENT, STORAGE MEDIUM STORING PROGRAM FOR PROTECTING DIGITAL CONTENT, AND STORAGE MEDIUM STORING PROGRAM FOR PROCESSING PROTECTED DIGITAL CONTENT

BACKGROUND OF THE INVENTION

1. Field of the Invention

The present invention relates to techniques for protecting rights associated with digital content.

2. Description of the Related Art

In recent years, a variety of digital content including images, video, documents, audio, game programs, and other software items have been provided to users from various content providers. In provision of such digital content, a technique referred to as DRM (Digital Rights Management) is often utilized to protect rights, such as copyright, of the content providers.

One common system for implementing the DRM technique utilizes electronic tickets. In this system, use of digital content distributed to users is restricted by, for example, encryption. Such use restriction is sometimes called "encapsulation". When a user wishes to use encapsulated digital contents (hereinafter simply referred to as capsules), they separately acquire an electronic ticket including information, such as a key, necessary for lifting the use restriction. An electronic ticket is sometimes referred to as a license. To use a capsule, a user accesses to a right manager server, and completes user authentication and ticket purchasing processes in order to acquire an electronic ticket.

For implementing a DRM system using electronic tickets, applications handling the capsules must generally have a function providing capability of dealing with use restriction (DRM function), such as decrypting digital content and operation restricting processing in accordance with use restrictions.

Applications having a plug-in mechanism (such as Acrobat (trademark) available from Adobe Systems Inc. in the United States) may later incorporate the DRM function into the main frame of the application. A related art suggests use of a plug-in technique for incorporating the DRM function into an application. As another related art, a DRM method using electronic tickets is also known.

However, the protection scheme using electronic tickets cannot be applied applications with neither a DRM function nor a plug-in mechanism. For example, "Word", a word processing application, or "Excel", a spreadsheet application, both produced by Microsoft Corporation, do not have a plug-in mechanism for DRM, and therefore data protection through DRM using electronic tickets cannot be applied through these applications.

SUMMARY OF INVENTION

According an aspect of the invention there is provided a device for protecting a digital content. The device includes: a digital content processing section that causes a digital content to be protected using security information; and an encrypting section that encrypts the security information, using a key acquired from a Digital Right Management system of an electronic ticket system.

According to another aspect of the invention, there is provided a device for processing data including protected digital content and security information which protect the digital content, the security information is encrypted. The device includes: an information obtaining section that obtains the encrypted security information; an electronic ticket acquiring section that acquires an electronic ticket to decrypt the encrypted security information from a Digital Right Management system; a decrypting section that decrypts the encrypted information using the electronic ticket to obtain the security information; and a processing section that processes the digital content using the decoded security information.

According to another aspect of the invention, there is provided a method for protecting digital content. The method includes: causing a digital content to be protected using security information, and encrypting the security information, using a key acquired from a Digital Right Management system of an electronic ticket system.

According to another aspect of the invention, there is provided a method for processing data including protected digital content and security information which protect the digital content, the security information is encrypted. The method includes: obtaining the encrypted security information; acquiring an electronic ticket to decrypt the encrypted security information from a Digital Right Management system; decrypting the encrypted information using the electronic ticket to obtain the security information; and processing the digital content using the decoded security information.

According to another aspect of the invention, there is provided a storage medium readable by a computer. The storage medium stores a program of instructions executable by the computer to cause the computer to perform a function. The function includes: causing a digital content to be protected using security information, and encrypting the security information, using a key acquired from a Digital Right Management system of an electronic ticket system.

According to another aspect of the invention, there is provided a storage medium for processing data including protected digital content and security information which protect the digital content, the security information is encrypted. The storage medium stores a program of instructions executable by the computer to cause the computer to perform a function. The function includes: obtaining the encrypted security information; acquiring an electronic ticket to decrypt the encrypted security information from a Digital Right Management system; decrypting the encrypted information using the electronic ticket to obtain the security information; and processing the digital content using the decoded security information.

BRIEF DESCRIPTION OF THE DRAWINGS

Embodiments of the present invention will be described in detail based on the following figures, wherein.

DETAILED DESCRIPTION OF THE INVENTION

Embodiments of the present invention will be described with reference to the accompanying drawings.

An embodiment in which a content protection method using a DRM (digital rights management) system with electronic tickets is applied to application software (hereinafter simply referred to as an application) having a content protection function will first be described. In the present embodiment, an electronic ticket is a key necessary for using a corresponding protected digital content, or data including at least part of information necessary for obtaining the key.

Figure 1:
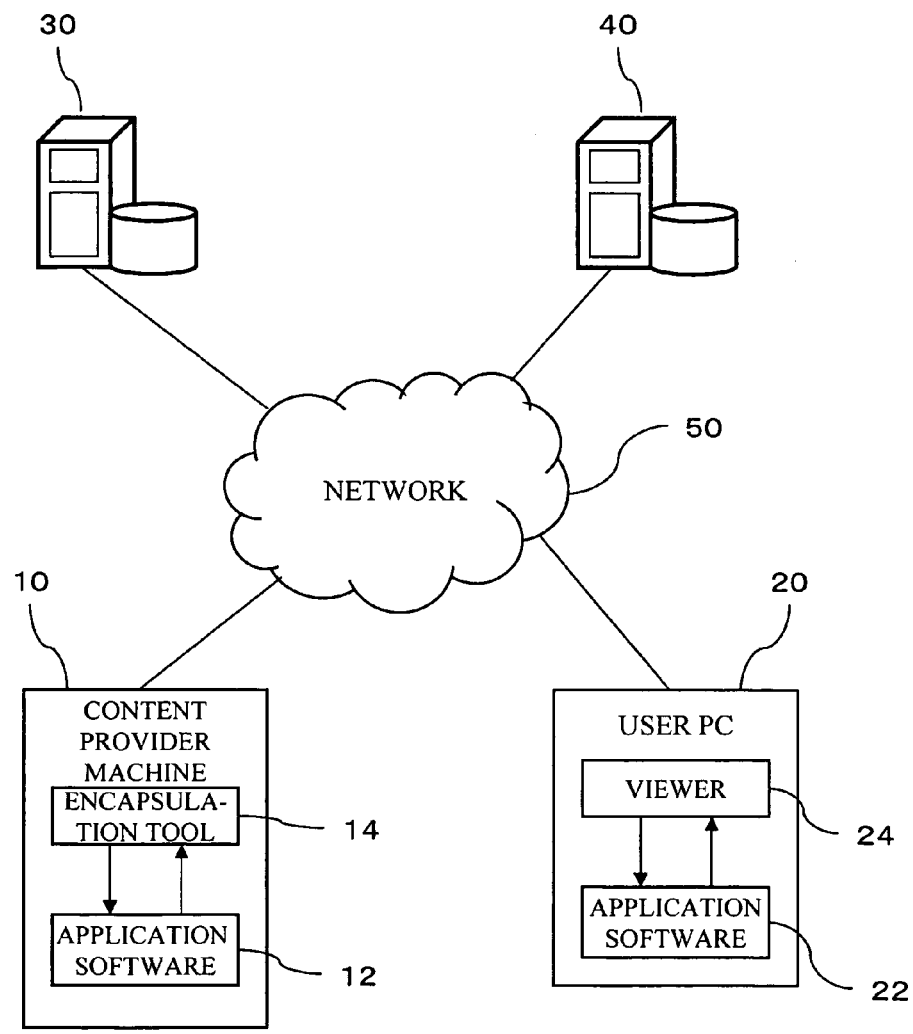
FIG. 1 shows a system configuration according to an embodiment of the present invention.

Referring to FIG. 1, a system of the present embodiment includes a content provider machine 10, a user PC (personal computer) 20 operated by a user, a DRM issuer server 30, and a DRM manager server 40. These devices 10-40 are mutually connected through a network 50, such as the Internet or a local area network. Such a connection, however, is not always required, and necessary information may be exchanged among the devices 10-40 through a medium such as a CD-ROM or the like.

The DRM issuer server 30 and the DRM manager server 40 are the elements forming a DRM system with electronic tickets. The DRM issuer server 30 issues a key for encapsulating digital content to be protected, and an electronic ticket for allowing use of a capsule. The DRM manager server 40 is a server for managing issuance of electronic tickets to users. The DRM manager server 40 authenticates users requesting issuance of an electronic ticket, and, if the user can be authenticated, provides the user with an electronic ticket issued by the DRM issuer server 30. While the DRM system is divided into the DRM issuer server 30 and the DRM manager server 40 in order to separately control issuance of electronic tickets and management of ticket issuance including user authentication, the functions of these servers can be performed by a single server if such separate control is not performed. As the DRM issuer server 30 and the DRM manager server 40, or a single integrated DRM system, publicly known devices, such as the one disclosed in the related art mentioned above or Windows Media (registered trademark) Rights Manager, can be used.

As is generally known, DRM systems include online type systems and offline type systems. An online type system requires the user PC to obtain an electronic ticket (also referred to as a license) from the DRM system every time a check must be made as to whether or not a user has a license or "right of use" of certain digital content (for example, when the user gives an instruction to open a file of the digital content). On the other hand, an offline type system allows an electronic ticket issued from the DRM system to be stored on the user PC for repeated use. One example of offline type systems is an access ticket system. The DRM issuer server 30 and the DRM manager server 40 in the example shown in FIG. 1 may be either the online type or the offline type. An offline type system will be mainly discussed hereinafter as an example.

A content provider machine 10 is a computer system for use in production of a capsule provided to a user from a content provider. In the content provider machine 10, an application 12 for forming or editing digital content is installed.

The application 12 may be software for word processing, spreadsheet, or drawing production. The application 12 has a function of protecting a digital content file with a password before it is stored. More specifically, when, for example, instructed to store the formed or edited content, the application 12 provides a user interface (hereinafter abbreviated as "UI") screen for password entry, and protects the content with the password entered on the screen before storing a file of the content. When instructed to open a content file protected with a password, the application 12 (and 22) dealing with the content provides the UI screen to prompt for a password, and open the file only when a correct password is entered on the screen. The application 12 is provided with an API (application program interface) for calling password protection mechanism and an API for calling mechanism for opening an password-protected file, and, through such APIs, receives an instruction to store a file with password protection from other programs or to open a password-protected file, and performs processing in accordance with the instruction. As the application 12 (and 22) having the password protection mechanism of this kind, Microsoft "Word" and "Excel" are widely known.

While only one application 12 is shown in the figure, the content provider machine 10 may have plural applications 12 having the password protection function.

An encapsulation tool 14 is software for encapsulating digital content provided to users by a content provider, to produce a capsule. The encapsulation is intended to protect the digital content under the DRM framework of the DRM issuer server 30 and the DRM manager server 40. For encapsulation, the encapsulation tool 14 utilizes the password protection mechanism of the application 12 by using the API provided by the application 12. In other words, the encapsulation tool 14 is designed so that it can apply digital content protection based on the electronic ticket system of the DRM system to the content formed and edited by the application 12 through utilization of the password protection mechanism of the application 12. The details of the process performed by the encapsulation tool 14 will be described later. The term "content provider" as used in this specification may refer to a content holder (owner) or a content distributor received a distribution request from the content holder.

The user PC 20 is a terminal device operated by a user of the digital content. The user PC 20 includes the application 22 dealing with the digital content provided by the content provider machine 10. The application 22 is an equivalent to the application 12 of the content provider machine 10, and has a function of opening a password-protected file. Because the digital content provided to the user is encapsulated by the encapsulation tool 14, the user PC 20 is provided with a viewer 24 having a decapsulating function. The viewer 24 performs decapsulation using the API of the application 22, and displays the resulting content to the user.

Figure 2:
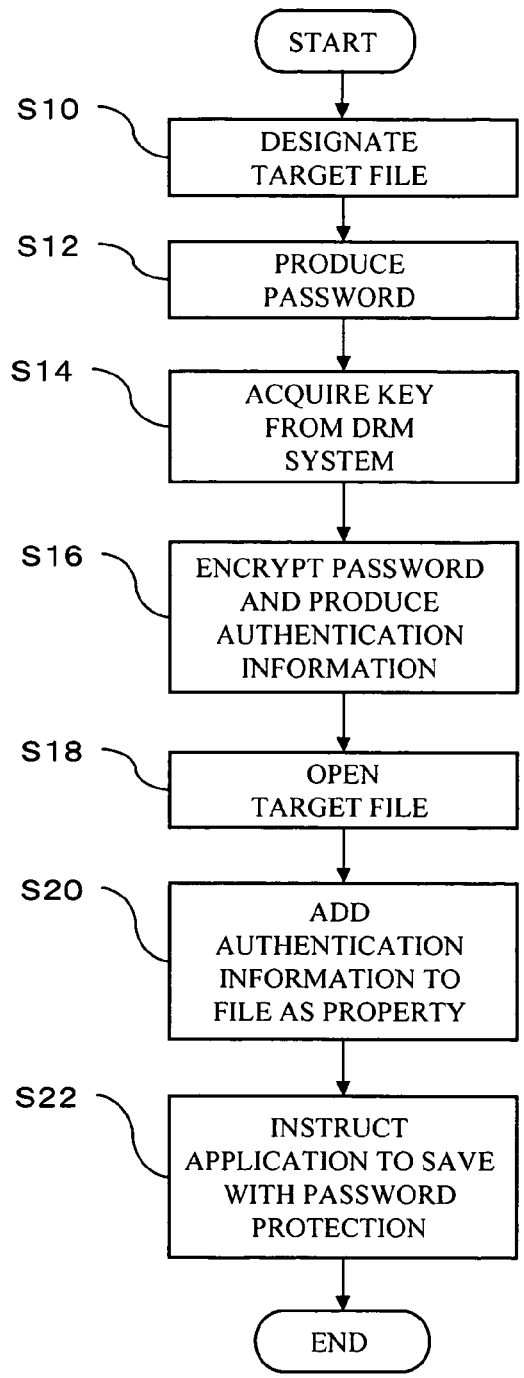
FIG. 2 is a flowchart showing a procedure of an encapsulation process.
Figure 3:
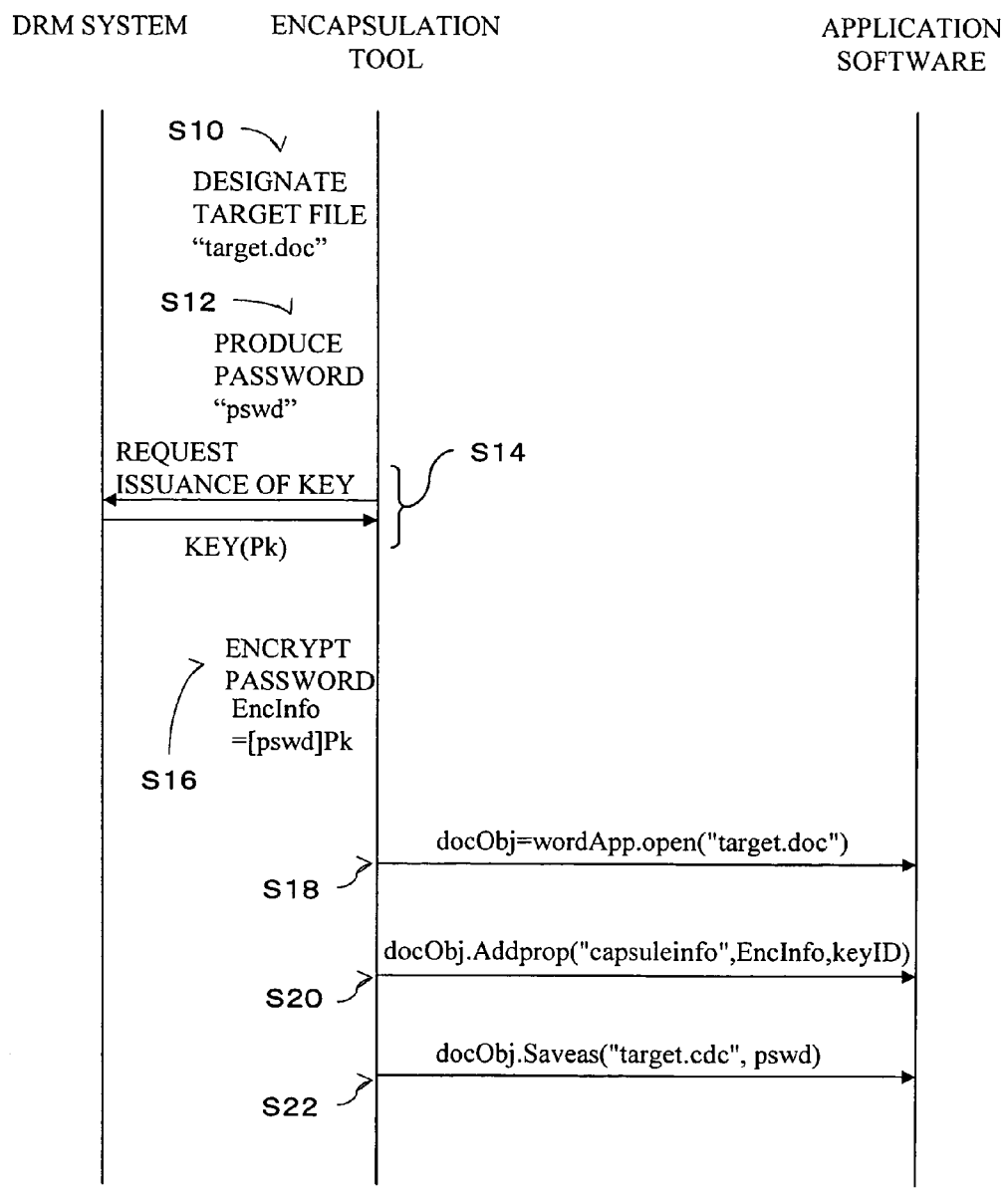
FIG. 3 shows exchange of instructions among an encapsulation tool, an application, and a DRM system.

The procedure of a process performed by the encapsulation tool 14 of the content provider machine 10 will next be described with reference to FIGS. 2 and 3. FIG. 2 is a flowchart showing the procedure of the process, and FIG. 3 shows instructions exchanged among the encapsulation tool 14, the application 12, and the DRM system in this process. Note that the DRM issuer server 30 and the DRM manager server 40 is integrated and shown as the DRM system in FIG. 3 to avoid complication.

As shown in FIG. 2, the procedure starts with operator's designation of a digital content file to be capsulated provided to the encapsulation tool 14 (S10). It is assumed here that a word processing application file "target.doc" is designated (see FIG. 3). The encapsulation tool 14 then automatically produces a password within a range (defined by, for example, maximum and minimum numbers of password characters) allowed by a password protection mechanism of the application 12 dealing with the digital content (S12). The password serves as a key for the application 12 to protect the digital content and open the protected content. A password produced with a random number or a pseudo random number can enhance security of the capsule. A random password can be created by, for example, producing binary data of a pseudo random number having a number of bytes corresponding to the maximum number of password characters allowed by the application 12, and converting it to text data interpretable by the application 12 as a password through a method, such as Base 64. The thus-formed password is indicated as "pswd" in FIG. 3.

The encapsulation tool 14 requests the DRM issuer server 30 forming the DRM system to issue a key for protecting the digital content, and acquires the key (denoted as "Pk") supplied from the server 30 in response to the request (S14). The steps S12 and S14 may be performed in the opposite order. The key "Pk" acquired at the step S14 is a public key for the DRM system using public key cryptography, or a secret key for the DRM system using secret key cryptography. In the secret key cryptography, a key ID (identifying information) "keyID" uniquely indicating the key is also acquired in association with the secret key from the DRM issuer server 30. When a key is issued, the DRM system (particularly the issuer server 30) registers and manages in a database the association between the key and the key ID (for the secret key cryptography) or the association between the key (public key) and the secret key (for the public key cryptography), as in the related art. These steps are included because such associations are necessary for issuing an electronic ticket at a later stage.

After acquiring the key from the DRM system, the encapsulation tool 14 encrypts the password "pswd" produced at the step S12 with the key "Pk" to produce authentication information "EncInfo" (S16.)

The encapsulation tool 14 then causes the application 12 to open the file designated at the step S10 using the API provided by the application 12 (S18). This API method is denoted as "wordApp.open" in FIG. 3. For the API method, the target file "target.doc" is designated as an argument. In accordance with the API method, the application 12 opens the target file, and returns an object identifier "docObj" of the opened target file to the encapsulation tool 14. Here, it should be noted that the form of the argument, method, and the like described in this specification are illustrative only, and for a specific application a method in the form in accordance with the API provided by the application can be used.

After the target file is opened, the encapsulation tool 14 adds the authentication information (i.e. encrypted password) produced at the step S16 to the target file as property information (S20). It is assumed that the application 12 can set property (attribute) information to the file, as can Microsoft "Word" and the like. In the example of FIG. 3, the property is set using the API method "Addprop" for property setting provided by the application 12. More specifically, the encapsulation tool 14 invokes, for the object of the target file "docObj", the method "Addprop" using as arguments the property name "capsuleinfo" indicating that it is the authentication information, the authentication information "EncInfo", and the key ID "keyID" of the key for encrypting the authentication information. The application 12 sets the authentication information and the key ID with the property name "capsuleinfo" for the object "docObj" by executing the method. Note that the property name "capsuleinfo" assigned to the authentication information and the like is predetermined in the present system, and the viewer 24 using the capsule also identifies the property information, such as the authentication information, using the property name "capsuleinfo". The key ID "keyID" is set as a property together with the authentication information "EncInfo" because the key ID "keyID" indicates the key necessary for the viewer 24 to decode the authentication information. When the DRM system used in the present embodiment employs the secret key cryptography, the key ID acquired together with the key from the DRM system is used. In the public key cryptography, the public key itself used for encryption can be used as the key ID set as a property because the secret key necessary for decoding is extremely difficult to derive from the public key even if the public key is known.

After completion of such property setting, the encapsulation tool 14 instructs the application 12 to save the object "docObj" having the set properties with password protection (S22). In the example of FIG. 3, a method "Saveas" for file saving is invoked for the object "docObj". By executing this method, the application 12 saves the object "docObj" as a file protected with the password "pswd" indicated by the argument under the file name "target.cdc" indicated by the argument. The object "docObj" at the step S22 includes the authentication information "EncInfo" and the like added as properties to the content of data (both the main body and the property) of the file "target.doc" designated at first, and the file "target.cdc" is the password-protected version of the file.

Thus, the process of adding the authentication information "EncInfo" and the like to the designated target file "target.doc" and saving it with password protection is "encapsulation" in the present embodiment, and the file "target.cdc" thus saved is a "capsule" in the present embodiment.

The extension ".cdc" in the file name is associated with the viewer 24. More specifically, the extension ".cdc" is registered as associated with the viewer 24 when the viewer 24 is installed in the user PC 20 controlled by Microsoft Windows (registered trademark) operating system. As a result, when a user performs an file opening operation, such as double-clicking" on the icon of the file "target.cdc" on a graphical user interface (GUI) of the file system provided by the operating system, the viewer 24, rather than the application 22, is activated to perform the process for opening the file.

The capsule produced and saved as described above may be provided to users through the network 50 or distribution of portable media, such as CD-ROMs, as in the related art.

In parallel with capsule distribution, the content provider registers in the DRM manager server 40 of the DRM system the conditions of issuing an electronic ticket for the digital content, as in the related art. The issuing conditions are the conditions defining users to whom an electronic ticket for the digital content is issued. For the same digital content, electronic tickets may be issued at plural levels providing different levels of usage rights (such as "read only", "modifiable", and "copyable"), and in such a case the conditions for each set of usage rights are defined as issuing conditions. For example, electronic tickets having different usage rights may be prepared for different fee levels when payment of a fee by the user is the issuing condition. Other than fee payment, the issuing conditions may be defined by user information. By way of example, the conditions may be set for each digital content by, for example, individually specifying a user ID of a user to whom an electronic ticket is issued for the content, or a group to which a user to receive an issued ticket should belong, or conditions of user properties (such as age, gender, position in office) that a user to whom a ticket is issued should have. Naturally, such conditions may be set for each level of the usage rights. When issuing conditions are thus defined by user information, the DRM manager server 40 performs user authentication when receiving a request to issue an electronic ticket, and determines whether or not to issue an electronic ticket and the content of rights of the ticket to be issued based on the user information of the authenticated user.

Figure 4:
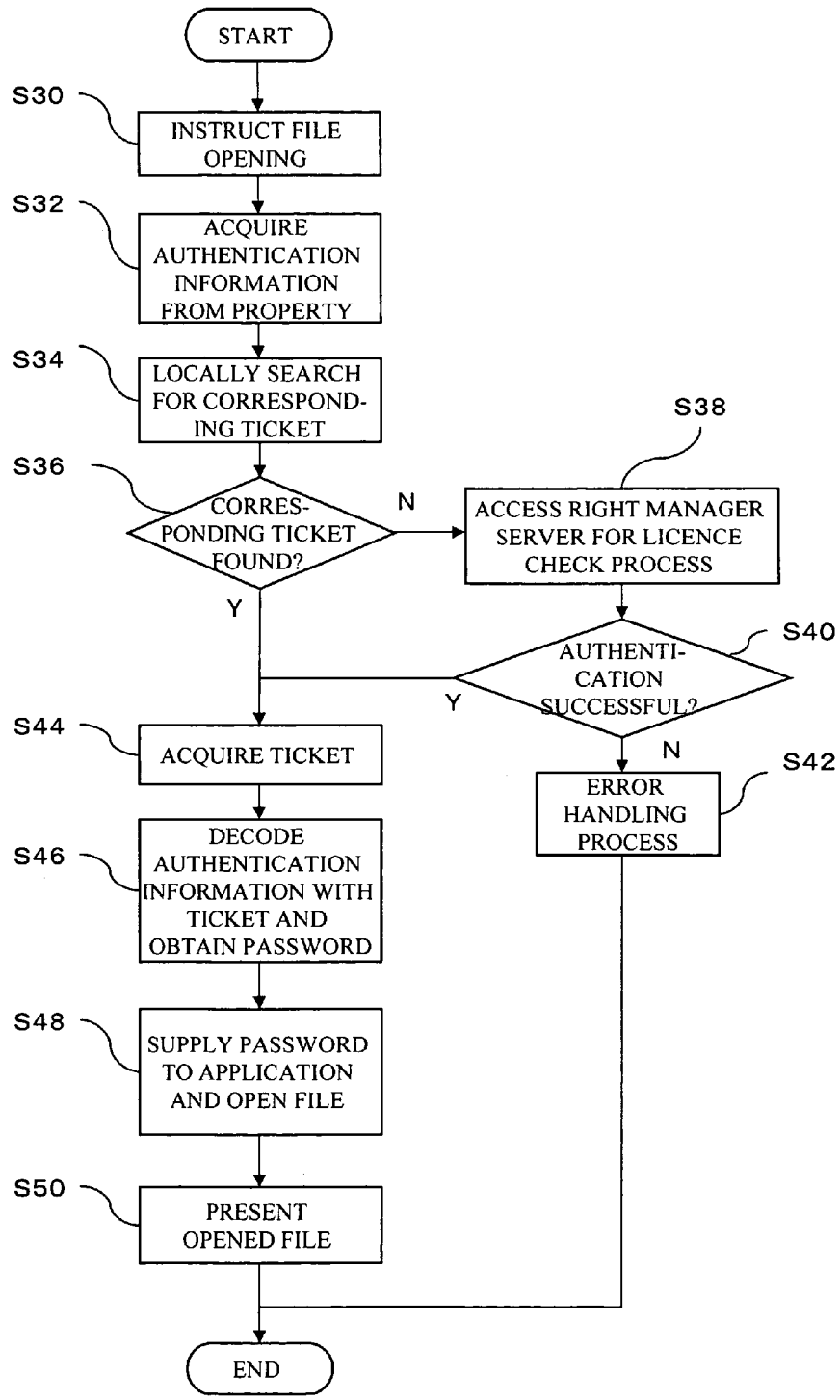
FIG. 4 shows a procedure of a process performed by a viewer.
Figure 5:
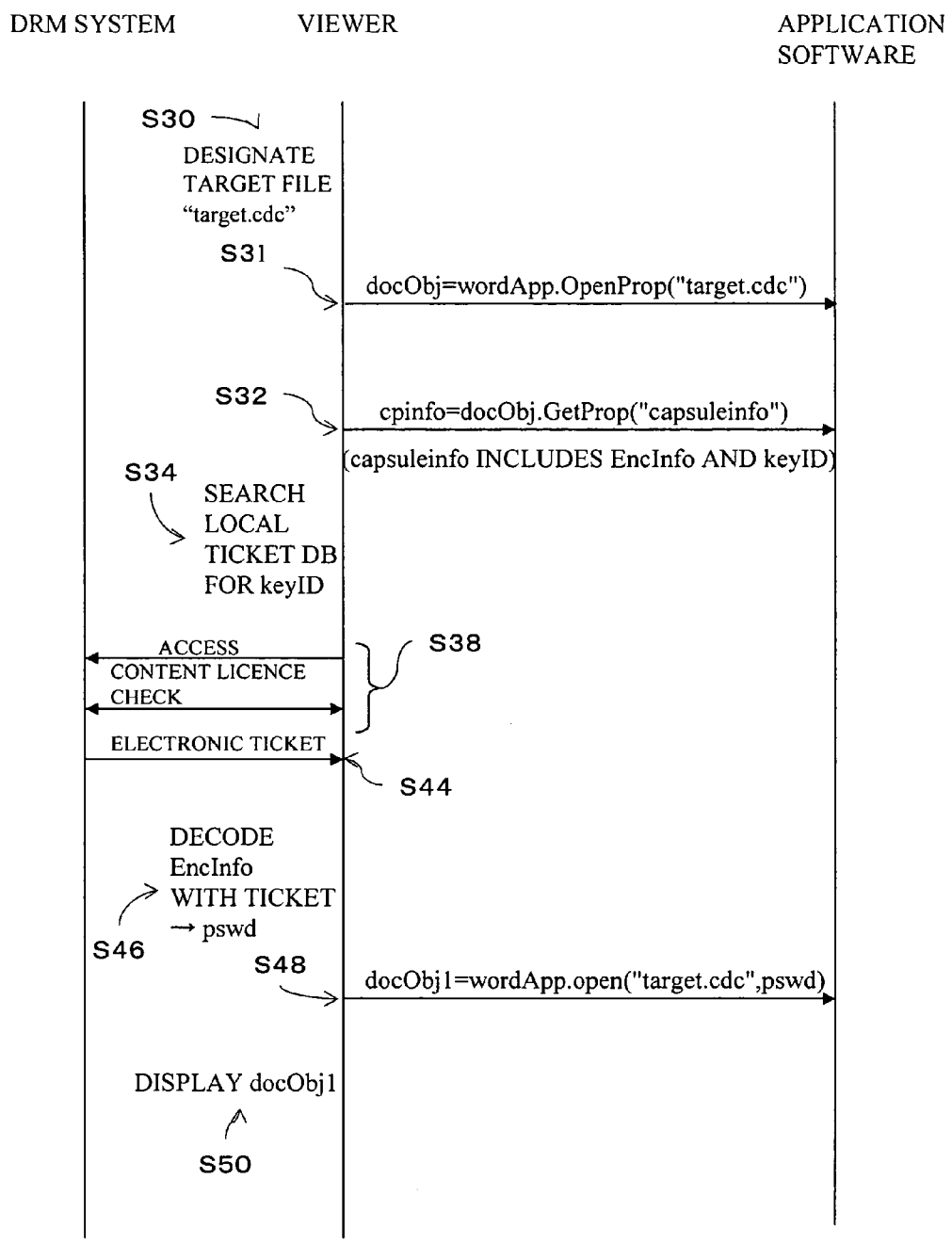
FIG. 5 shows exchange of instructions among the viewer, the application, and the DRM system.

A procedure of a process performed by the viewer 24 in the user PC 20 attempting to use a capsule will be described with reference to FIGS. 4 and 5. FIG. 4 is a flowchart showing the procedure of this process, and FIG. 5 shows exchange of instructions among the viewer 24, the application 12, and the DRM system in this process.

This process is initiated when the already activated viewer 24 is instructed to open a capsule, or when opening of a capsule is instructed on a file system and the viewer 24 is activated in response thereto (S30). In the example of FIG. 5, opening of the file "target.cdc" is instructed. In response to this instruction, the viewer 24 first uses an API "wordApp.OpenProp" for opening the property of the file ("target.cdc" in the illustrated example) among the APIs provided by the application 22 to produce the object "docObj" for receiving an API "Getprop" for reading the property of the file for the application 22 (S31).

Using the API of the application 22 for reading the property, the viewer 24 reads out authentication information "capsuleinfo" among property data of the object "docObj" (i.e. file "target.cdc") (S32). In the example of FIG. 5, the name "capsuleinfo" of the property to be read out is designated as an argument using the API method "Getprop". Because the authentication information is set with that property name in the file of the capsule, the application 22 reads out data of the property "capsuleinfo", and returns it to the viewer 24.

As described in connection with description of the encapsulation tool 14, the property "capsuleinfo" includes the encrypted authentication information "EncInfo" and "keyID" which is information identifying the key necessary for decrypting the information. Receiving the property information, the viewer 24 searches the local environment of the user PC 20 for an electronic ticket corresponding to that key ID "keyID" (S34). Here, it should be noted that an offline type DRM system is being described. More specifically, in the offline system, an electronic ticket acquired from the DRM system is stored in a ticket database (not shown) in the local environment of the user PC 20, and therefore determination is made at the step S34 as to whether or not an electronic ticket corresponding to the current target file "target.cdc" is included in a group of acquired electronic tickets. Because an electronic ticket includes information for identifying a key that can be dealt with by the ticket, the electronic ticket having the key ID of the same value as the "keyID" obtained from the property information of the target file is searched for at the step S34. Alternatively, a content ID uniquely assigned to certain digital content may be incorporated into a capsule as a property information item, and also into an electronic ticket. In such a case, an electronic ticket corresponding to a capsule can be identified by the content ID rather than the key ID.

If the search at the step S34 indicates that no corresponding electronic ticket is found in the local environment, the viewer 24 accesses the DRM manager server 40 to perform a license check (S38). The license check process is performed for determining whether or not a user operating the viewer 24 has the right to acquire an electronic ticket for using the digital content of interest. For this determination, the viewer 24 transmits the key ID "keyID" of the capsule (or the ID of the content) acquired at the step S32 to the DRM manager server 40. After reception, the DRM manager server 40 determines whether or not to grant issuance of a ticket based on the issuing conditions (described above) registered in association with the key ID (or the content ID). For example, when a ticket is issued in response to a fee payment, determination is made that an electronic ticket can be issued when fee payment operation is performed from the viewer 24 side. When determination as to whether or not to grant issuance of a ticket is made based on user information, the DRM manager server 40 requests the viewer 24 to enter user authentication information (such as a pair of user ID and password), and performs user authentication based on the user authentication information entered in response thereto. If it is determined through user authentication that the access is made by a legitimate user, determination is then made whether or not the user information of that user satisfies the issuing conditions of that digital content, and, if satisfied, a decision is made that an electronic ticket can be issued. Such a license check process itself is not particularly characteristic, and various known methods can be used.

If the license check is failed (i.e. it is decided that an electronic ticket cannot be issued) (S40), the viewer performs an error-handling process by, for example, displaying a message saying that the user cannot use the digital content (S42), and the process for opening the content is terminated. The error handling process is not always necessary.

If the license check is successful (S40), the DRM manager server 40 passes the information identifying the digital content (such as the key ID or the content ID described above) to the DRM issuer server 30, and requests issuance of an electronic ticket. When the usage rights for the ticket are requested in license check in view of the issuing conditions, the information on the usage rights is also transmitted to the issuer server 30. The DRM issuer server 30 issues an electronic ticket in accordance with the received information. The DRM manager server 40 receives the issued electronic ticket, and transmits it to the viewer 24. The process advances to the step S44, at which the viewer 24 acquires the electronic ticket.

If it is found at the step S36 that the corresponding electronic ticket is found in the local ticket database, the viewer 24 acquires the electronic ticket from the ticket database (S44).

The step S36 is unnecessary when the DRM issuer server 30 and the DRM manager server 40 are the online type DRM system because electronic tickets (licenses) are not stored in the user PC 20. In this case, the viewer 24 must always perform license check at the step S38.

When the electronic ticket corresponding to the target content file is acquired (S44), the viewer 24 decodes the authentication information "EncInfo" using the electronic ticket (S46). In the access ticket system disclosed in Japanese Patent Laid-Open Publication No. Hei 10-247905, for example, the key for decoding the encrypted authentication information "EncInfo" can be obtained from information formed by a combination of the information included in the electronic ticket and unique information held in the hardware contained in the user PC 20 or connected to the user PC 20 (such as an IC card and a USB (universal serial bus) device) (the unique information is assigned to each hardware item by an access ticket system). In the access ticket system or a similar system, information for identifying the user PC 20 or hardware connected thereto may be transmitted from the viewer to the DRM system in addition to the content ID or the key ID for specifying the digital content in order to receive issuance of the electronic ticket. In the DRM system using Windows Media (registered trademark) Rights Manager, the decoding key included in electronic ticket (license) data is used. By decoding the authentication information "EncInfo" using the thus acquired key, the password "pswd" for opening the password-protected capsule "target.cdc" can be obtained.

The viewer 24 then passes the password "pswd" to the application 22, and opens the capsule "target.cdc" (S48). Among the APIs of the application 22, the viewer 24 uses the API method "wordApp.open" for instructing opening of a file, and designates information "target.cdc" specifying a file to be opened and the password "pswd" as arguments. Upon receiving the instruction, the application 22 opens the file with the password "pswd". The viewer 24 receives an object "docObj1" of the opened file, and uses it to display the content of the file on the screen (S50).

Some electronic tickets include information on the usage rights provided to users. When such an electronic ticket is used, the viewer 24 controls so that, upon display of the opened file, the menu items displayed on an operation menu of a file display screen are limited to those allowed according to the usage rights, or the items unallowable according to the usage rights are displayed as unselectable. When the usage rights in the electronic ticket includes information on an expiration date of the rights or the maximum number of usable times, the viewer 24 determines whether or not the period of use has expired, or whether or not the number of times the ticket has been used exceeds the maximum number, as in the related art. If the period of use has expired or the number of uses exceeds the limit, display of the file is canceled.

Figure 6:
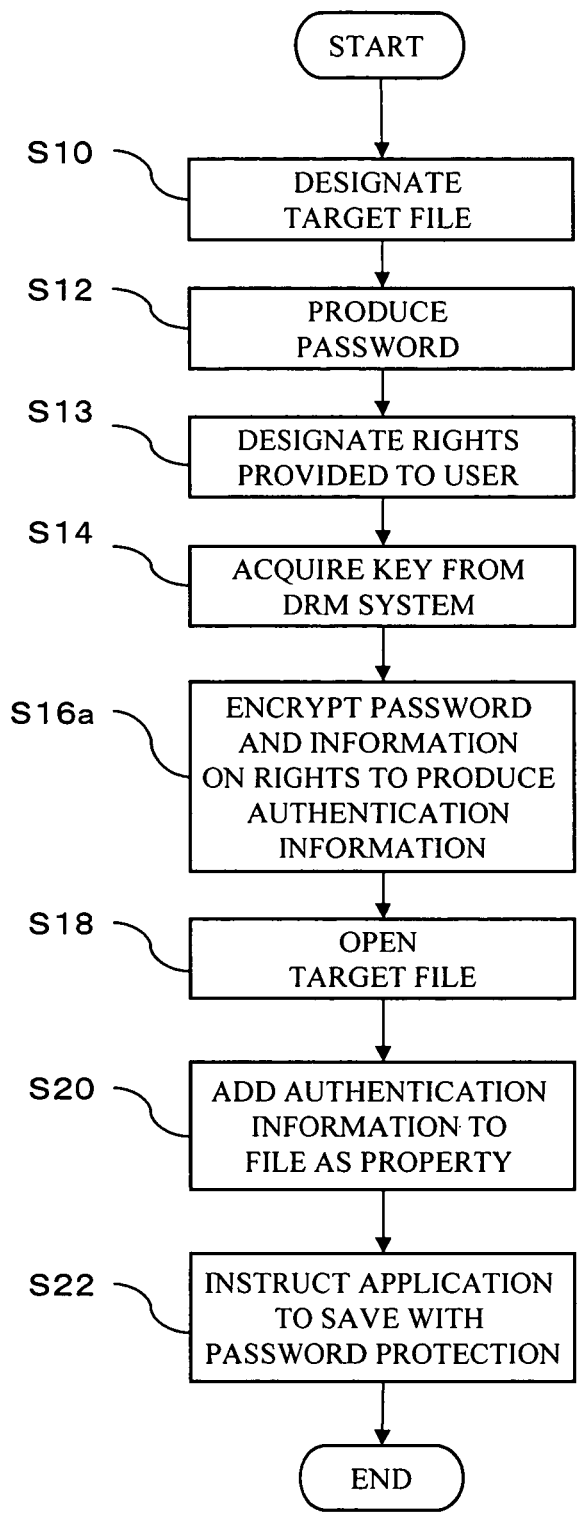
FIG. 6 is a flowchart of an encapsulation procedure for incorporating information on usage rights into a capsule.
Figure 7:
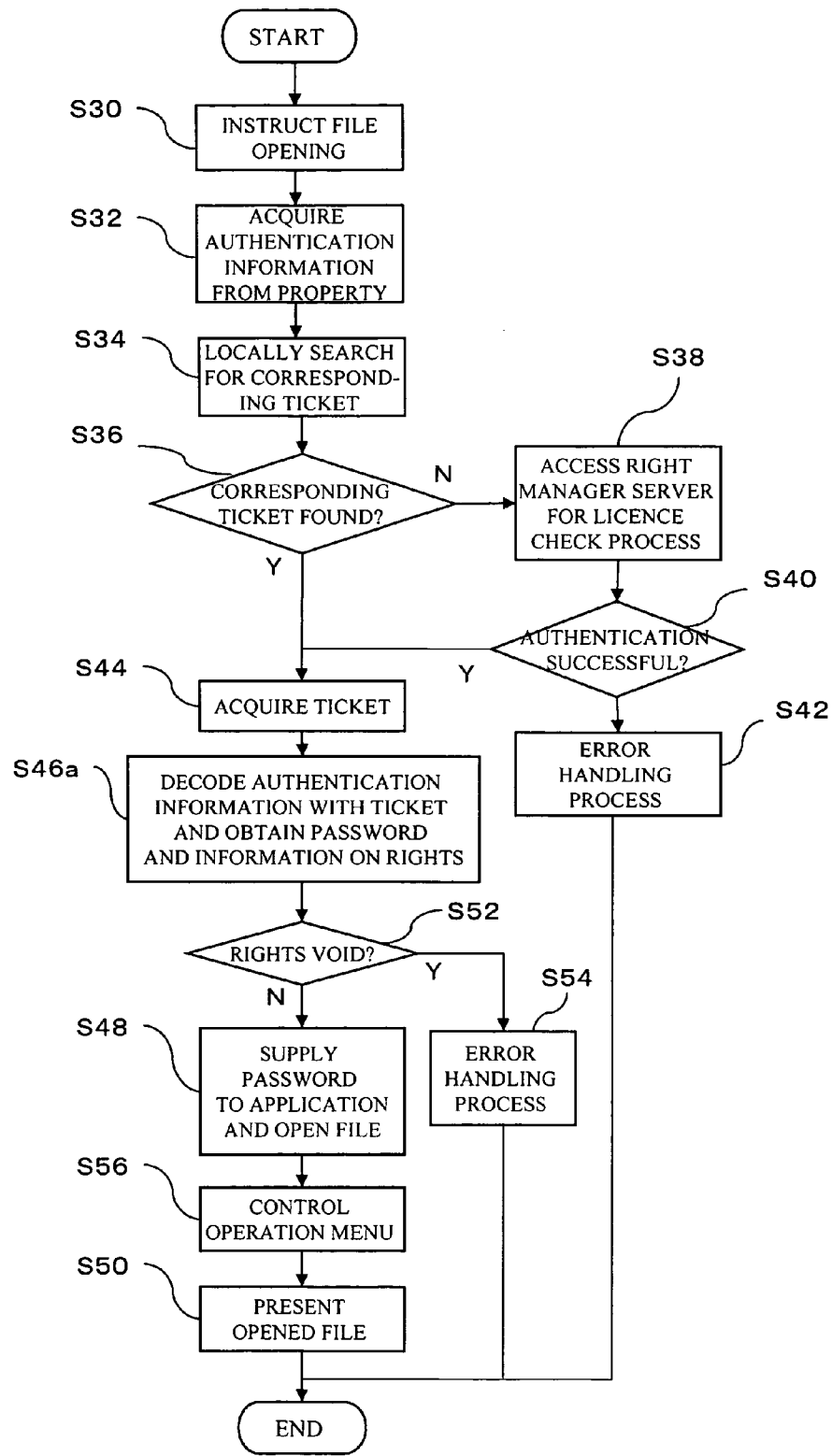
FIG. 7 shows a procedure of a process performed by the viewer handling a capsule having the information on usage rights incorporated thereto.

Such information on the usage rights may be embedded in a capsule itself. A procedure of the process performed by the encapsulation tool 14 and the viewer 24 in such a configuration is shown in FIGS. 6 and 7. In FIGS. 6 and 7, the steps similar to those in the procedure of FIGS. 2 and 4 are labeled with the same numerals, and description thereof will not be repeated.

Compared with the procedure of FIG. 2, the procedure of the encapsulation tool 14 in FIG. 6 additionally includes a step S13 at which rights (allowable and unallowable operations, the expiration date, the maximum number of usable times, and the like) granted to a user is set by an operator. The step S13 may be performed at any timing between the steps S10 and S16a. At the step S16a, the password "pswd" and the information of the rights set at the step S13 are combined, and the combined information is encrypted with the key acquired from the DRM system to produce the authentication information "EncInfo". The remaining process is performed as in the procedure of FIG. 2.

At a step S46a in the procedure of the viewer 24 in FIG. 7, the information on the usage rights and the password is acquired by decoding the authentication information "EncInfo", unlike the step S46 in FIG. 4. Determination is made as to whether or not the user's rights have expired at a step S52 by comparing the expiration date indicated by the usage rights acquired at the step S46a and the current time (S52). When the specification of usage rights indicates a maximum number of allowed uses, the number of times used may be checked at the step S52. If the determination at the step S52 indicates that the period of use has expired (or the number of uses will exceed the maximum), an error handling process is performed (S54), and the process is terminated without opening the file. If the period has not yet expired, the target file is opened at the step S48, and the menu item indicated as selectable in the operation menu on the file display screen in accordance with the usage rights acquired at the step S46a is selected. A displayed screen corresponding to the selection result is then produced (S56), and the content of the opened file is displayed on the display screen (S50).

While the encrypted authentication information "EncInfo" is set as property data of the target file protected with a password in the above-described example, the authentication information "EncInfo" may be managed without being included in the target file, such as by saving the authentication information "EncInfo" as a different file from the target file. In such a case, at least one of the file of the authentication information "EncInfo" and the target file is provided with data indicating the association between the two. For example, the two files can be named in an associated manner, or one or both of the files may include, for example, information on the association as property information. The authentication information "EncInfo" may be registered in a database rather than being filed. Even when the authentication information is not included in the target file, and produced as different information from the target file in a manner associated with each other, it is included within the range of "encapsulation" in the present invention. When a capsule is output to an external device for distribution or the like, the encapsulation tool 14 outputs the file protected with a password, i.e. the main body of the capsule, and the data of the authentication information "EncInfo" associated therewith as a pair. The device receiving the capsule (such as a server for distributing the digital content and the viewer 24) also has a function of managing the paired received file and authentication information in the associated manner. That is, the file and the authentication information are distributed as a pair among the elements of the system of the present embodiment.

In the embodiment described with reference to FIGS. 1-7, the encapsulation tool 14 encrypts the password used for password protection of the applications 12 and 22 with the key acquired from the DRM system, and the encrypted information is associated with the password-protected content file, and distributed to users. The user can decode the encrypted information by passing the license check (determination as to whether or not a ticket can be issued) of the DRM system and receiving an electronic ticket, and can open the password-protected content file with the password obtained through decoding. The capsule is protected under management of the DRM system, and in principle only the user with the electronic ticket acquired from the DRM system can use the digital content.

For achieving this mechanism, the applications 12 and 22 need only have the password protection function and the interface for allowing external programs (the encapsulation tool 14 and the viewer 24) to use it. More specifically, even if the applications 12 and 22 are not directly adapted to the DRM system, or cannot accept a plug-in for the DRM function, a file of the application can be protected in the electronic ticket system according to the system of the present embodiment.

While some applications may protect a file they handle in other methods than the password protection method, it should be readily understood that the above-described system can be applied even to such applications. In protecting a file in other methods than the password protection method, security information necessary for rendering a protected content file usable is encrypted with the key of the DRM system, so that the resulting encrypted data is provided to users in association with the target file.

An embodiment in which a file formed and edited by an application is protected under the electronic ticket system using the content protecting function of the application has been described. Next, an embodiment in which a license of a digital content protected by the DRM system at a lower level is managed by the DRM system at an upper level will be described. This embodiment is particularly useful for managing the use of digital contents by plural applications in a unified manner when such plural applications forming and editing the digital contents conform to different lower level DRM systems.

However, an example in which a single lower level DRM system is used will be described below to avoid complication. When plural lower level DRM systems work for a single upper level DRM system, the upper level DRM system performs the below-described process for each lower level DRM system.

The upper level DRM system may be either an online or an offline type, similarly to the embodiment described with reference to FIGS. 1-7, and the difference in process between these types has been described in connection with the above embodiment. To avoid complication, the following description is related to an upper level DRM system of the offline type.

An example will be described with reference to FIGS. 8-10. For convenience of description, the lower level DRM system will be assumed as the online type. In a system configuration of FIG. 8, the lower level DRM system includes a lower level DRM issuer server 60 and a lower level DRM manager server 70. A lower level encapsulation device 10B includes an application compatible with the lower level DRM system, and encapsulates a content file formed and edited by the application for the sake of protection by the lower level DRM system. A pair of the lower level DRM system and the lower level encapsulation device 10B corresponds to the applications 12 and 22 in the embodiment of FIG. 1. These lower level DRM system and encapsulation device 10B may be similar to the systems used in the related art.

An upper level DRM issuer server 30A and an upper level DRM manager server 40A correspond to the servers 30 and 40 in the above embodiment, respectively, and these two servers form the upper level DRM system. An upper level DRM encapsulation device 10A corresponds to the encapsulation tool 14 of FIG. 1, and performs a special process for managing the lower level DRM at the upper level DRM. The process performed by the upper level DRM encapsulation device 10A will be shown in a flowchart of FIG. 9.

The user PC 20 includes an application dealing with a digital content file and a viewer (not shown), similarly to the user PC 20 in the embodiment of FIG. 1. The viewer corresponds to the viewer 24 of FIG. 1, and performs a distinctive process as a system managing the lower level DRM at the upper level DRM. The flow of the process is shown in FIG. 10.

The flow of the process of the present embodiment will be described with reference to FIGS. 8-10. In FIG. 8, an arrow in a solid line indicates a data flow in an encapsulation process, and that in a broken line indicates a data flow in capsule opening.

The flow of the process for encapsulating a digital content file to be distributed will first be described with reference to FIGS. 8 and 9.

When an operator designates a file to be encapsulated and instructs the upper level DRM encapsulation device 10A to perform an encapsulation process (S60), the upper level DRM encapsulation device 10A sends a target file to a lower level DRM encapsulation device 10B to ask for encapsulation (C1, S62). The upper level DRM encapsulation device and the lower level DRM encapsulation device may be implemented as different server programs executed by a single hardware device, and in such an implementation a file is simply transferred between the two programs.

After receiving the request, the lower level DRM encapsulation device 10B requests the lower level DRM issuer server 60 to issue a key (C2). After receiving that request, the lower level DRM issuer server 60 forms a key and a key ID (or content ID), and sends them back to the lower level DRM encapsulation device 10B (C3). The lower level DRM encapsulation device 10B encrypts the target file with the received key, and adds the key (content) ID to the resulting encrypted data, thereby forming a capsule. The device 10B then sends the produced capsule back to the upper level DRM encapsulation device 10A.

The upper level DRM encapsulation device 10A receives the capsule formed by the lower level DRM encapsulation device 10B (hereinafter referred to as a "lower level capsule") (S64), and produces a user ID and password for user authentication as a random character string (S66). The device 10A transmits the user ID and the password and the key ID obtained from the lower level capsule to the lower level DRM manager server 70, and requests the server to set a license of the key ID corresponding to that user ID (C5, S68). In response thereto, the lower level DRM manager server 70 sets the license, and transmits a status of "setting OK" to the upper level DRM encapsulation device 10A (C6).

When the upper level DRM encapsulation device 10A asks the upper level DRM issuer server 30A to issue a key for protection at the upper level DRM (C7), a key (public key in the public key cryptology, or a pair of a secret key and the key ID of the secret key in the secret key cryptology) is returned from the upper level DRM issuer server 30A (C8). The upper level DRM encapsulation device 10A acquires the key (S70), encrypts the user ID and the password for user authentication described above with the key for the upper level DRM, and combines the encrypted information and the key ID for identifying the key to remove protection of the upper level DRM (the public key itself in the public key cryptology), thereby forming upper level DRM authentication information (S72). By adding the upper level DRM authentication information to the lower level capsule, a capsule for distribution is produced (S74). The produced capsule for distribution is distributed to users by known means (C9). The content provider registers the conditions of issuing an electronic ticket for the distributed capsule in the upper level DRM manager server 70 using a conventionally known mechanism.

The process for opening the distributed capsule by the viewer of the user PC 20 will be described with reference to FIGS. 8 and 10.

When a user activates the viewer to instruct it to open a capsule they wishe to use (S80), the viewer acquires the upper level DRM authentication information embedded in the capsule (S82). The upper level DRM authentication information includes the encrypted user ID and user authentication password, and the key ID for the upper level DRM. The viewer determines whether or not the electronic ticket corresponding to that key ID is present in the local environment of the user PC 20 (S84, S86) If present, the process advances to a step S94. Otherwise, the viewer accesses the upper level DRM manager server 40A, and checks the license similarly to the step S38 in FIG. 4.

During the license check operation, the upper level DRM manager server 40A determines from the pre-registered issuing conditions whether or not the requested user has a license. If cannot be determined that the user has a license (that is, it is determined that the user does not have a license), an error-handling process is performed (S92), and the series of process steps is terminated. If it is determined that the user has a license, issuance of an electronic ticket corresponding to the key ID for the upper level DRM is requested to the upper level DRM issuer server 30A (U2). If the rights of the user are limited, the ticket issuance request is transmitted with the usage conditions. In response to the request, the upper level DRM issuer server 30A issues and returns an electronic ticket conforming to the designated conditions (issued usage rights) corresponding to the designated key ID (U3). The manager server 40A receives and transmits the electronic ticket to the viewer (U4).

Upon receiving the ticket (S94), the viewer obtains a key for decoding using the electronic ticket, and decodes the encrypted user ID and user authentication password in the upper level DRM authentication information with the key (S96). The viewer sends to the lower level DRM manager server 70 the decoded user ID and user authentication password, the lower level DRM key ID acquired from the capsule for distribution, and information on the usage rights designated in the electronic ticket (U5), and acquires an electronic ticket for removing protection by the lower level DRM (S98, U8).

In processing at the step S98, the user ID and the user authentication password are used for user authentication at the lower level DRM manager server 70. Because the pair of user ID and password is already registered in the lower level DRM manager server 70 at the step S68 as requested from the upper level DRM encapsulation device 10A, user authentication succeeds. In addition, because the license of the key ID was (or should have already been) set for that user ID in the manager server 70 at the same step S68, the server 70 determines that an electronic ticket can be issued, thereby and therefore transmits the key ID and information on the usage rights to the lower level DRM issuer server 60 (U6), requesting issuance of an electronic ticket. In response thereto, the lower level DRM issuer server 60 returns an electronic ticket including a decode key for the lower level capsule (or information for decoding) and the usage conditions (granted usage rights) (U7). The lower level DRM manager server 70 sends the electronic ticket back to the viewer (U8).

Upon receiving the electronic ticket (S98), the viewer processes the electronic ticket to acquire the decode key, and opens the lower level capsule in the distributed capsule with the decode key (S100). The viewer allows the user to use the opened capsule within the limitation of usage conditions of the electronic ticket (S102).

Figure 8:
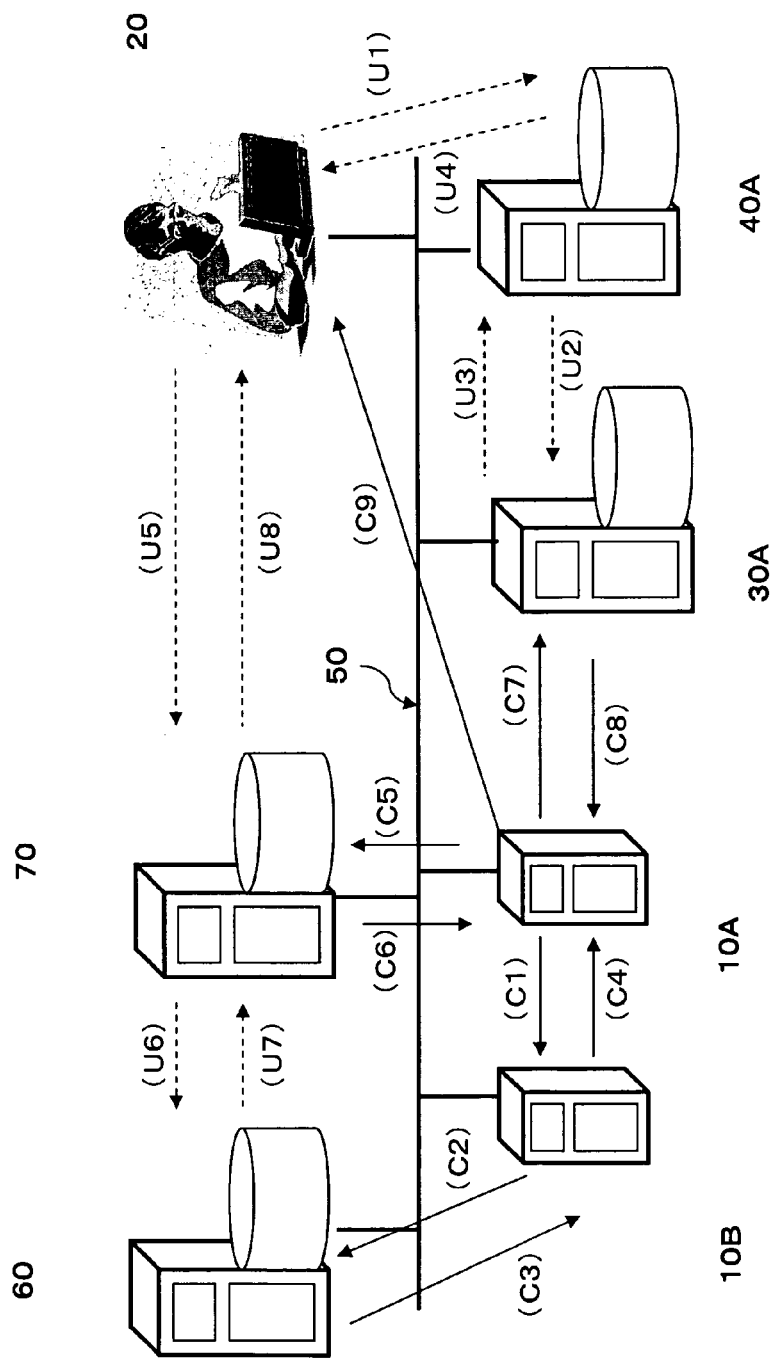
FIG. 8 is a view for describing a system according to another embodiment of the present invention.
Figure 9:
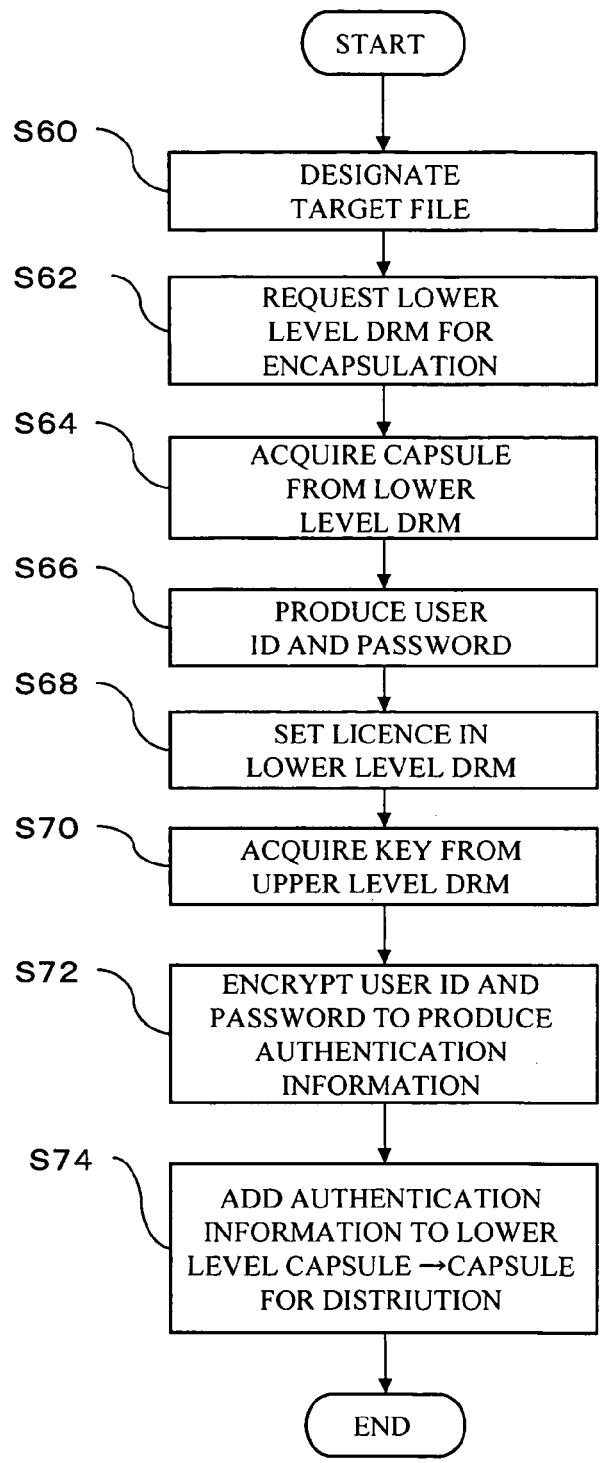
FIG. 9 is a flowchart showing a procedure of an encapsulation process.
Figure 10:
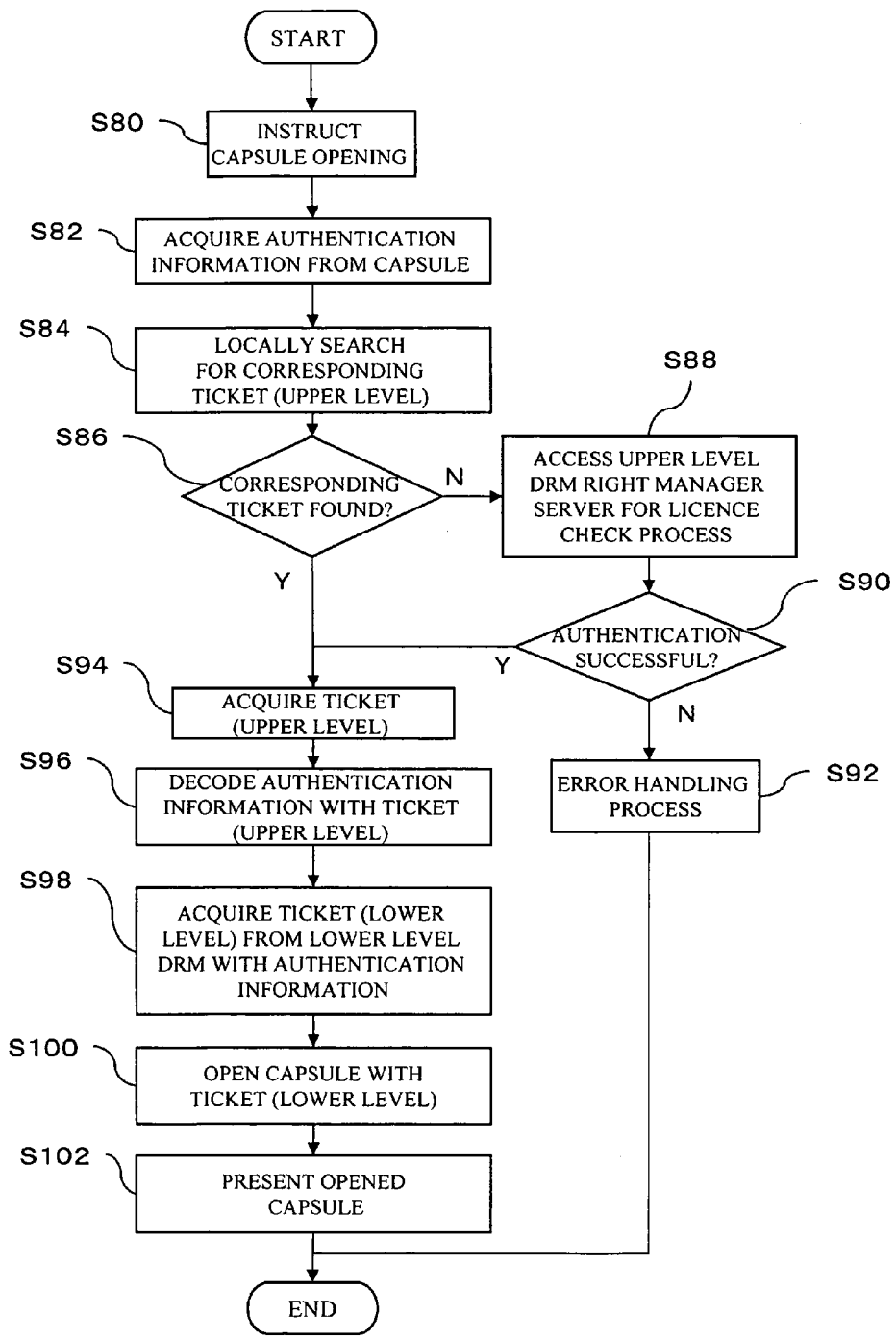
FIG. 10 shows a procedure of a process performed by the viewer.

Thus, in the system of FIGS. 8-10, a file of the application compatible with the lower level DRM system but not with the upper level DRM system must be encapsulated, and therefore the encapsulation process is substantially performed by the lower level DRM encapsulation device 10B using the lower level DRM system. On the other hand, the license of the user for the capsule must be managed in an integrated manner by the upper level DRM. In consideration of this point, in the present example, the upper level DRM encapsulation device 10A automatically produces the user ID and password for user rights management by the lower level DRM system to produce a virtual user, and registers the virtual user's license for the capsule in the lower level DRM system. While security of the capsule can be maintained as long as information (user ID and password) of the virtual user does not leak to outsiders but kept only to the valid right holder, the valid user cannot use the capsule protected by the virtual DRM if information of the virtual user is not transmitted to the user having the valid right. Consequently, in this example, the information of the virtual user (user ID and password) is encrypted with a key provided by the upper level DRM system, and added to the capsule before distributed to the user. In using the capsule, the user is subjected to the license check performed by the upper level DRM system. The user passing the check can obtain authentication information of the virtual user from the capsule, and therefore can acquire the license from the lower level DRM system using the authentication information, so that they can use the capsule.

While the lower level DRM system has been described as the online type in the example of FIGS. 8-10, the scheme can be similarly implemented for the lower level DRM system of the offline type. The significant difference arising from adopting the offline type lower level DRM system is that it is possible that the electronic ticket corresponding to the lower level capsule produced by the lower level DRM encapsulation device 10B may already be held in the user PC 20, while in the online type system such a situation never occurs because a ticket is acquired each time a digital content is used and becomes void after it is used. For the offline lower level DRM system, when opening of a capsule for distribution is instructed (S80) in the process procedure of FIG. 10, the viewer of the user PC 20 first acquires a key ID (public key) of the lower level DRM from the lower level capsule in the distributed capsule, and searches the local environment for the electronic ticket corresponding to that key ID. If the ticket is found, the lower level capsule is opened using that electronic ticket (S100). In this case, the process from the step S82 to the step S98 is skipped. If the ticket corresponding to the key ID of the lower level DRM cannot be found in the local environment, the process from the step S82 and the subsequent ones will be performed.

A first modification of a system configuration in which the lower level DRM system is managed by the upper level DRM system will be described with reference to FIGS. 11-13.

Compared with the system of FIGS. 8-10, the information encrypted by the upper level DRM system is different in the first modification. In the system of FIG. 8, the ID and password of the virtual user produced by the upper level DRM encapsulation device 10A are encrypted, while in this modification the key ID (content ID) of the lower level capsule produced by the lower level DRM encapsulation device 10B is protected (encrypted). If the user succeeds in the license check by the upper level DRM system, the key ID of the lower capsule is decoded by the electronic ticket acquired in response to the success, and the electronic ticket corresponding to the lower level capsule can be acquired from the lower level DRM system using that key ID.

Figure 11:
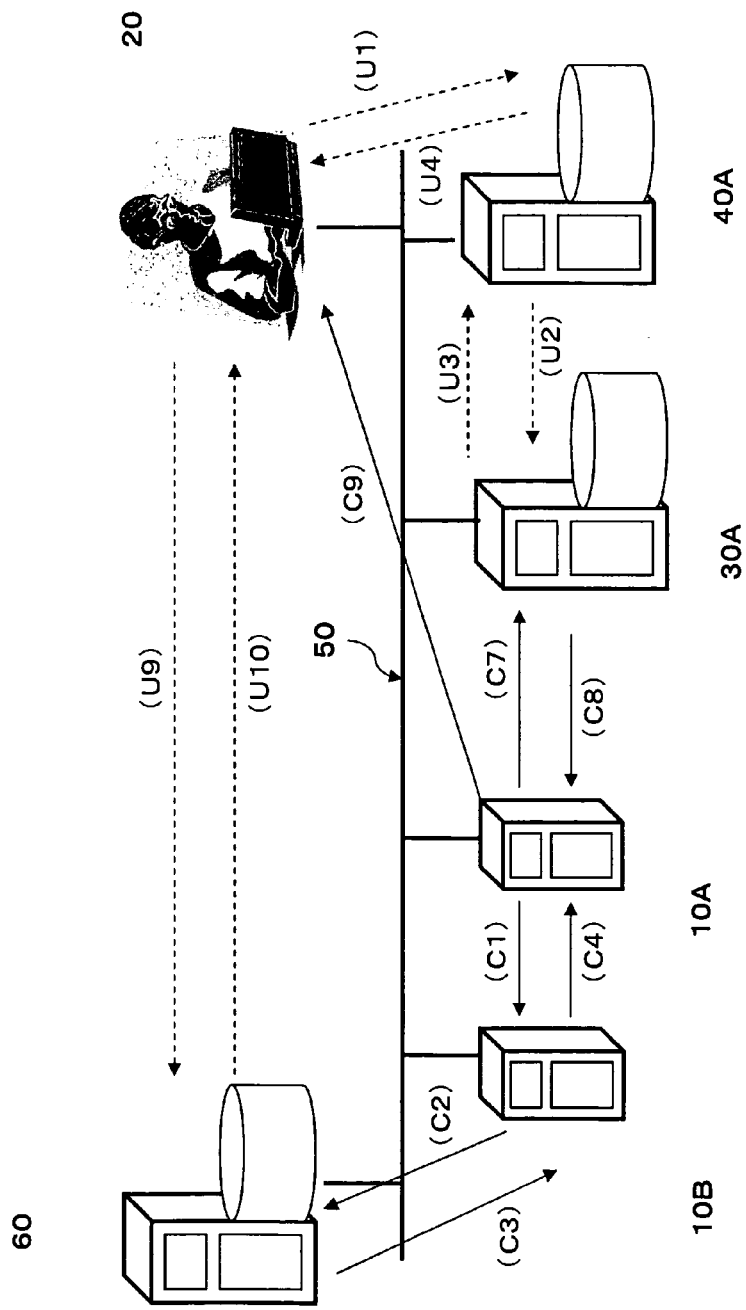
FIG. 11 is a view for describing a system according to a first modification.

The lower level DRM manager server 70 illustrated in FIG. 8 is unnecessary in this modification (see FIG. 11).

The flow of the process for encapsulating a digital content file in the first modification will be described with reference to FIGS. 11 and 12, in which the steps and data flow corresponding to those shown in FIGS. 8 and 9 are labeled with the same numerals, and description thereof will not be repeated.

In this process, steps S76 and S72a are different from the flow in FIGS. 8 and 9. More specifically, while the user ID and password are produced at the step S66 in FIG. 9, in this modification the upper level DRM encapsulation device 10A obtains the key ID from the lower level capsule acquired at the step S64 (S76), whereby the key ID is deleted from the lower level capsule. At the step S72a, the key ID (of the lower level DRM) is encrypted with the key acquired from the upper level DRM, and the encryption result and the key ID (of the upper level DRM) indicating the key for decryption are combined to produce authentication information. At the step S74, the authentication information is added to the lower level capsule to produce the capsule for distribution. In this procedure, the license of the virtual user is not registered in the lower level DRM manager server 70 (C5, C6 in FIG. 8, and S66, S68 in FIG. 9).

The process for opening the distributed capsule by the viewer of the user PC 20 will be described with reference to FIGS. 11 and 13. The procedure of FIG. 13 is the same for the steps S80-S94 (U1-U4) as that of FIG. 10. When an electronic ticket is acquired at the step S94, the viewer decodes the encrypted key ID (of the lower level DRM) in the authentication information acquired at the step S82 using the electronic ticket (S96a). The key ID is transmitted to the lower level DRM issuer server 60 (U9 in FIG. 11), and the electronic ticket corresponding to that key ID is acquired from the lower level DRM issuer server 60 (U10, S98a). The viewer opens the lower level capsule in the distributed capsule by the acquired electronic ticket (S100), and presents it to the user (S102).

Thus, the system configuration of the first modification is simpler than that of the example in FIGS. 8-10. This modification can sufficiently protect the capsule when the key ID of the lower level DRM system cannot be easily guessed, such as a random number, because guessing the key ID to attack the system is difficult.

While the lower level DRM system has been described as an online type in the first modification, a similar method can be applied to an offline type lower level DRM system. Even if an electronic ticket corresponding to the key ID is already present on the user PC 20 in the offline system, it cannot be found until the key ID is decoded because the key ID of the lower level capsule is encrypted in this modification. As a result, in the process performed by the viewer, the key ID is first decoded with the electronic ticket of the upper level DRM, and the electronic ticket corresponding to the key ID is locally searched for, and, if unfound, acquired from the lower level DRM issuer server 60. The remaining process steps are the same as those of the online type.

Figure 12:
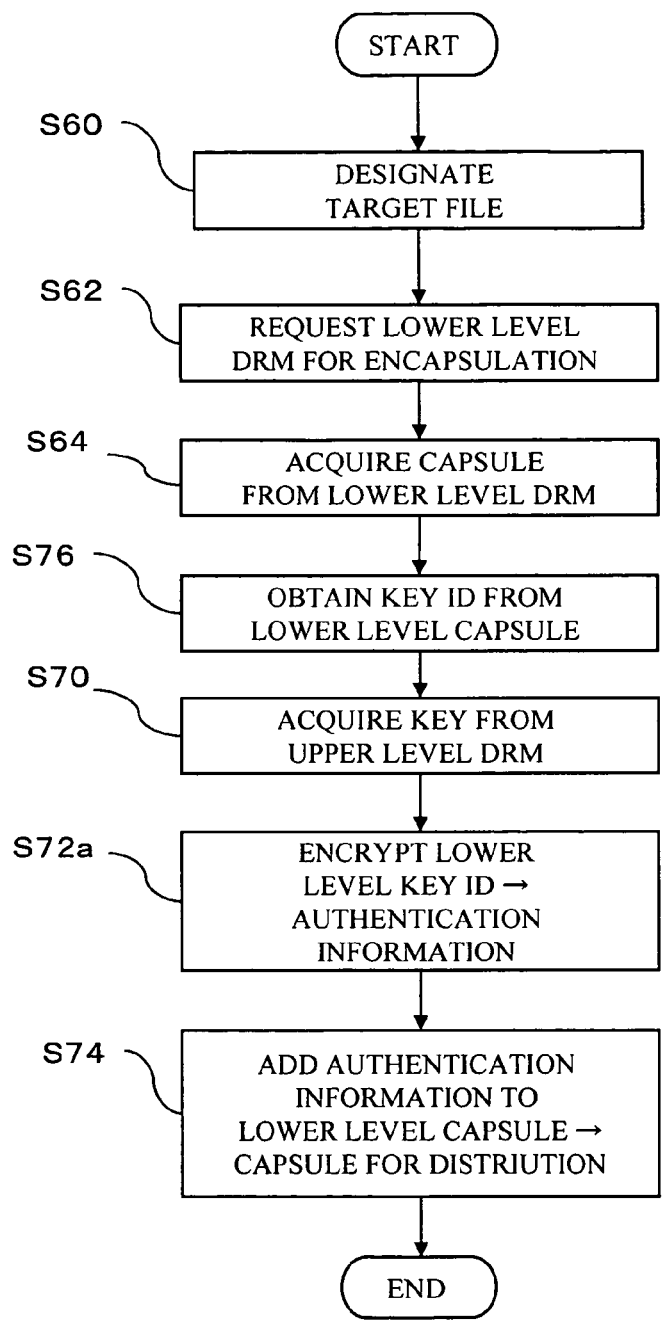
FIG. 12 is a flowchart showing a procedure for an encapsulation process.
Figure 13:
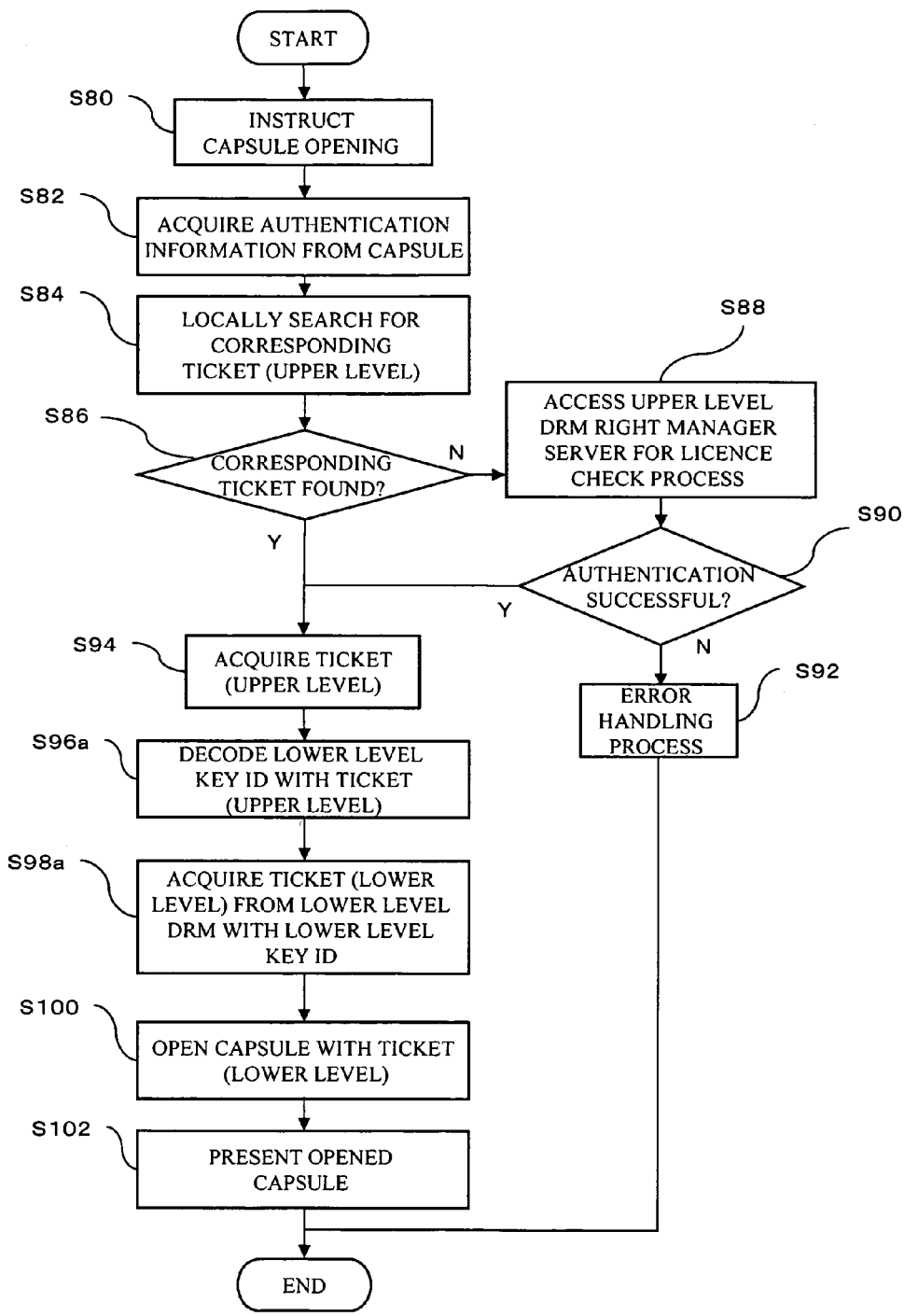
FIG. 13 shows a procedure of a process performed by the viewer.
Figure 14:
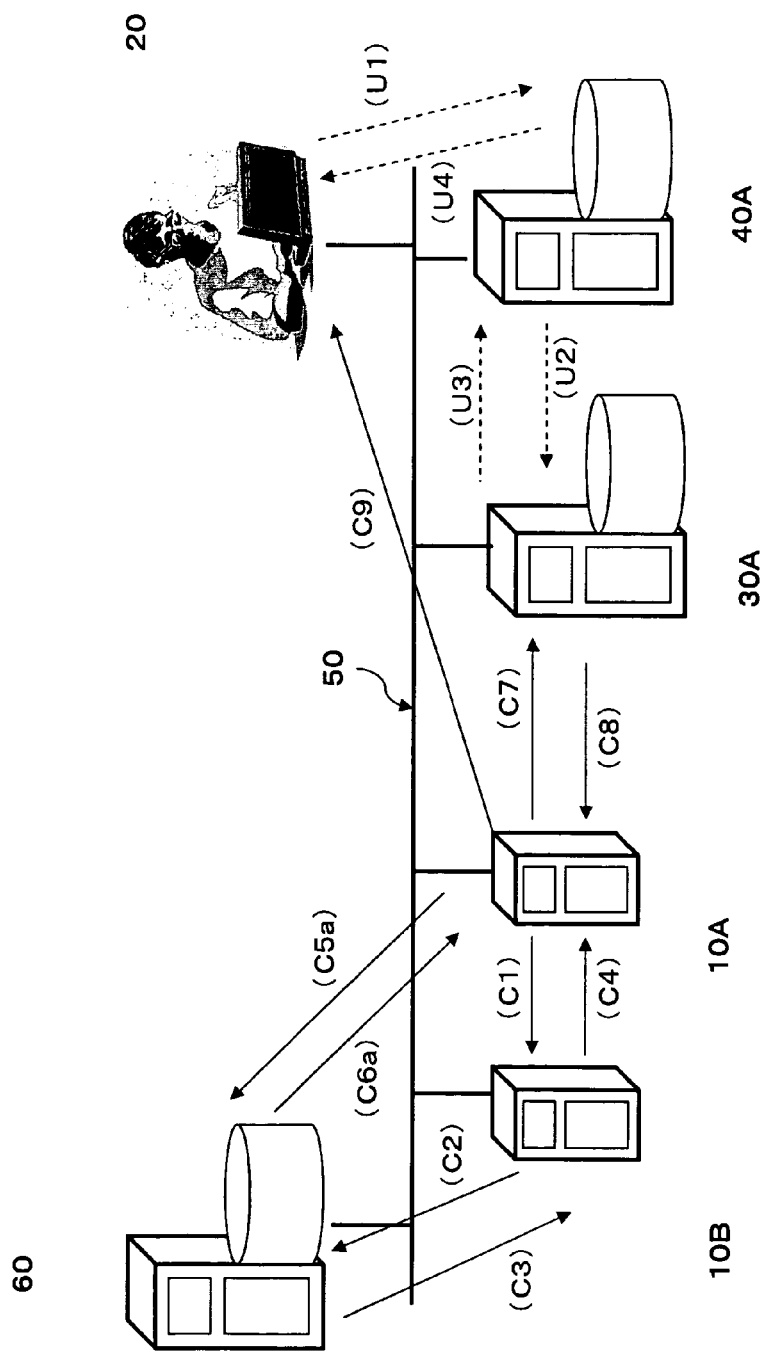
FIG. 14 is a view for describing a system according to a second modification.
Figure 15:
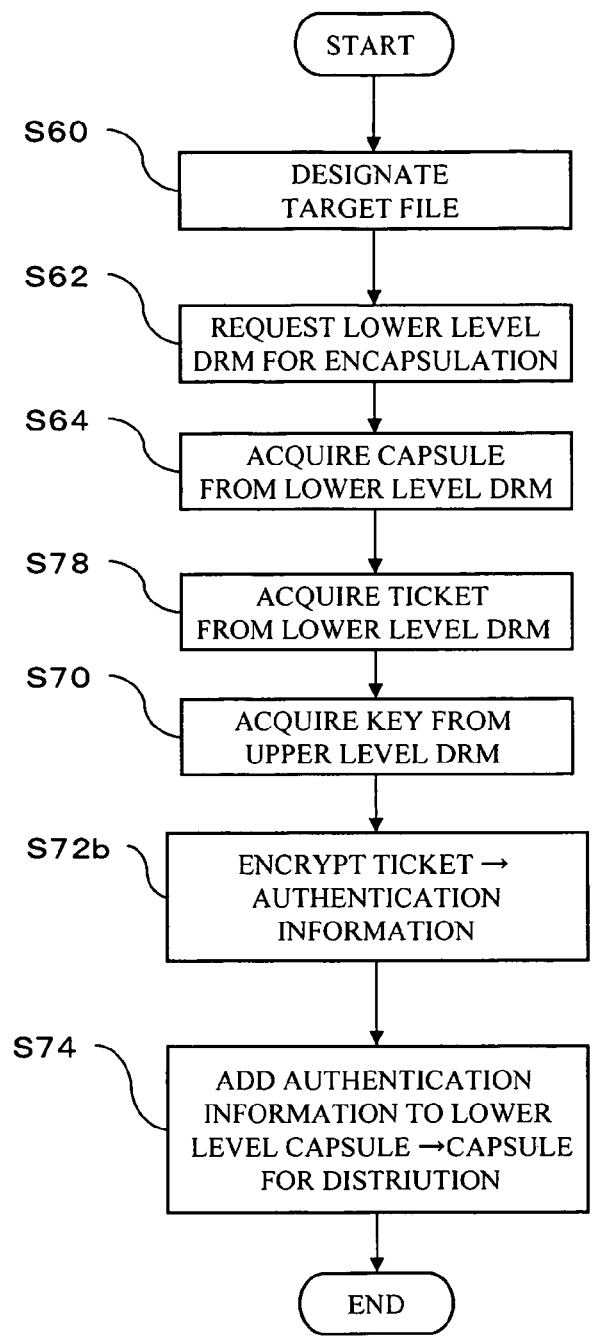
FIG. 15 is a flowchart showing a procedure of an encapsulation process.
Figure 16:
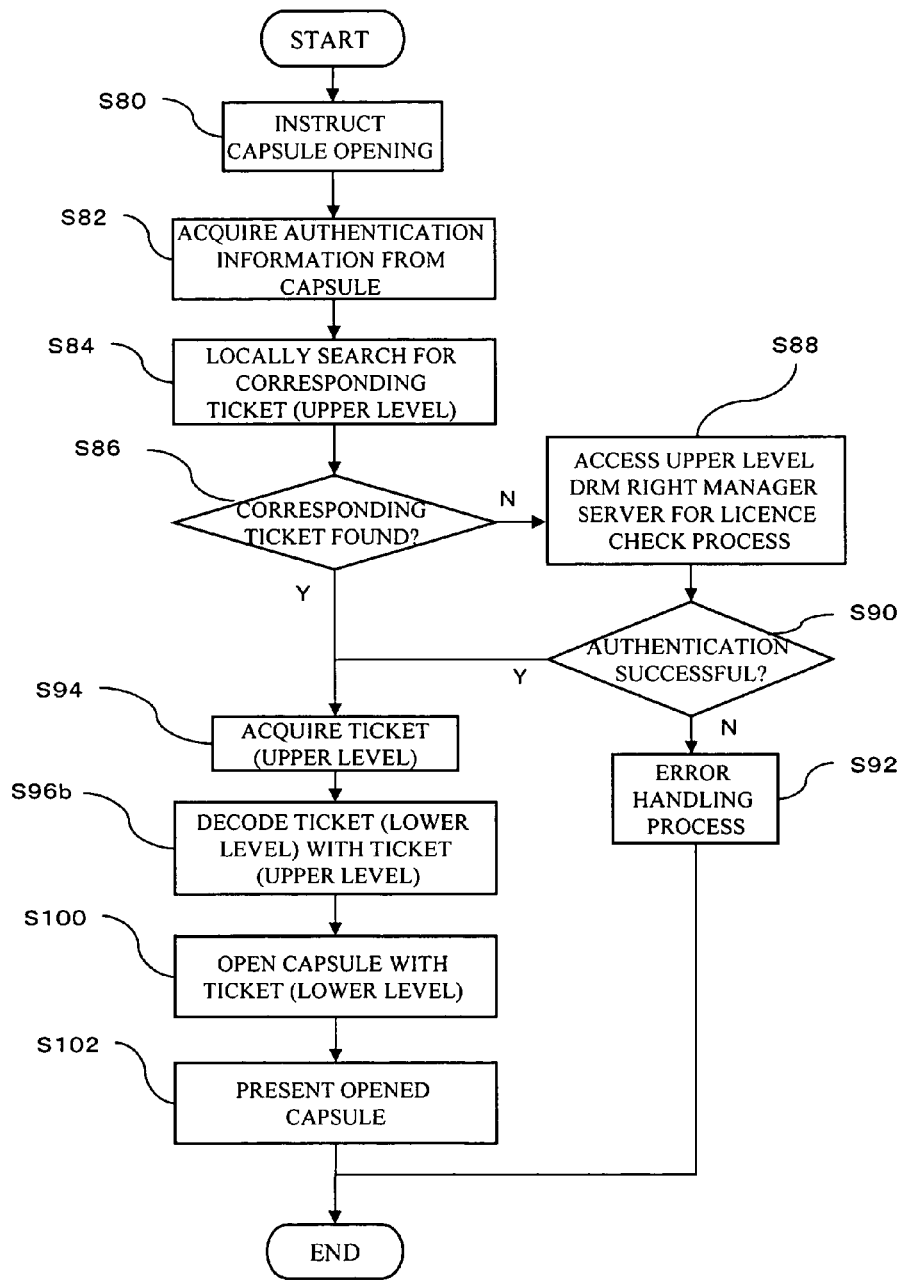
FIG. 16 shows a procedure of a process performed by the viewer.

The first modification described above is further advanced to a second modification shown in FIGS. 14-16, in which the steps substantially the same as those in the procedure of FIGS. 11-13 are labeled with the same numerals, and description thereof will not be repeated.

While the key ID of the lower level capsule is protected by the upper level DRM and embedded in the distributed capsule in the above-described first modification, in the second modification the electronic ticket corresponding to that key ID is acquired from the lower level DRM issuer server 60 at the encapsulation stage, and the electronic ticket is protected by the upper level DRM and embedded in the distributed capsule.

The procedure of the process performed by the upper level DRM encapsulation device 10A is shown in FIG. 15. The difference from the first modification (FIG. 12) lies in a step S78 (C5a, C6a in FIG. 14) and a step S72b. More specifically, in the second modification, after receiving the lower level capsule from the lower level DRM encapsulation device 10B (S64), the upper level DRM encapsulation device 10A transmits the key ID in the lower level capsule to the lower level DRM issuer server 60 (C5a), and asks for issuance of, and receives, the electronic ticket corresponding to the key ID (S78, C6a). The electronic ticket is encrypted with a key acquired from the upper level DRM issuer server 30A (S72b), and the encrypted electronic ticket is combined with the key ID corresponding to the key used for encryption to produce authentication information, which is added to the lower level capsule to produce the distributed capsule (S74).

Acquiring the electronic ticket of the upper level DRM system at the step S94, the viewer of the user PC 20 decodes the encrypted information in the authentication information obtained from the distributed capsule with the electronic ticket, thereby acquiring the electronic ticket for the lower level capsule (S96b). The lower level capsule is opened by using the electronic ticket for the lower level capsule, thereby rendering the content file in the capsule usable (S100). When the use of the electronic ticket (for the lower level) is terminated (by, for example, closing the opened content file), the electronic ticket is deleted from a storage device in the local environment.

As described above, the electronic ticket for the lower level capsule is included in the distributed capsule in the second modification, the viewer of the user PC 20 need not acquire a ticket for the lower level capsule from the lower level DRM system. When a user uses a capsule, they use the ticket in the capsule, and is not subjected to authentication by the lower level DRM according to the second modification. Therefore, the second modification is basically applied to the offline type lower level DRM.

While the viewer deletes the electronic ticket of the lower level capsule after use in the above-described second modification, it is because, when the electronic ticket is issued, the lower level DRM issuer server 60 does not indicate to the upper level DRM encapsulation device 10A the usage rights for the ticket. More specifically, because the lower level DRM is of the offline type in this example, if the lower level DRM ticket is decoded and registered in the ticket database on the user PC 20 without the usage rights being properly set (i.e. without restriction of rights), it is possible that the capsule may be used with the lower level DRM ticket without acquiring an electronic ticket from the upper level DRM. In consideration of this possibility, in the above-described second modification, an electronic ticket registered in the ticket database is deleted after the digital content is used, so that the user must be authenticated by the upper level DRM each time they attempt to use a capsule.

Meanwhile, the usage rights may be set in the electronic ticket of the lower level DRM embedded in the lower level capsule. This may be achieved by, for example, a process in which an operator from the content provider enters on the upper level DRM encapsulation device 10A the usage rights provided to the user for the digital content, and the usage rights are transmitted from the upper level DRM encapsulation device 10A to the lower level DRM issuer server 60, so that the electronic ticket with those usage rights is issued and embedded in the lower level capsule. In such a case, the processing load of the upper level DRM system may be reduced by managing so that the usage rights of the electronic ticket issued to the user by the upper level DRM accords with (matches, or includes the right of the lower level ticket) the usage rights of the electronic ticket of the lower level DRM embedded in the lower level capsule. In other words, once the user PC 20 passes the license check of the upper level DRM, the electronic ticket of the corresponding lower level DRM is validated and registered in the local ticket database such that, the user can open the capsule with the electronic ticket of the lower level DRM in the local database, and the user PC 20 is not subjected to the license check of the upper level DRM.

While, in the above-described embodiments and modifications for managing a digital content of the lower level DRM by the upper level DRM, the upper level DRM encapsulation device 10A encrypts the user ID and password produced by itself and the key ID of the lower level capsule or the license of the lower level capsule with a key of the upper level DRM, the lower level capsule itself may be encrypted with the key of the upper level DRM. If this is the case, a step of decoding the encrypted lower level capsule with the electronic ticket acquired from the upper level DRM is added to the process performed by the viewer. Although in the example of FIG. 12, the key ID is obtained from the lower level capsule at the step S76, and encrypted with the key of the upper level DRM at the step S78, the key ID in the lower level capsule may be protected by using the step of encrypting the entire lower level capsule with the key of the upper level DRM instead of these two steps.

While the invention has been described in conjunction with specific embodiments, it is evident to those skilled in the art that modifications may be made thereto in light of the foregoing description. Accordingly, it is intended that the appended claims cover all such modifications that fall within the spirit and scope of the invention.

According to an aspect of the invention there is provided a device for protecting a digital content. The device includes: a digital content processing section that causes a digital content to be protected using security information; and an encrypting section that encrypts the security information, using a key acquired from a Digital Right Management system of an electronic ticket system.

According to another aspect of the invention, the digital content processing section may cause application software having a digital content protecting function to protect the digital content.

According to another aspect of the invention, the device may further include a password producing section that produces a password used for protection of the digital content by the application software, wherein the application software may be caused to protect the digital content using the password, and the encrypting section may encrypt the password as the security information.

According to another aspect of the invention, the encrypted information may be added to the digital content as property information.

According to another aspect of the invention, the digital content processing section may causes lower level Digital Right Management system which is different from the Digital Right Management system to protect the digital content.

According to another aspect of the invention, the device may further include a user authentication information generating section that generates user authentication information for the lower level Digital Right Management system, and a section that sets right regarding the protected digital content in the lower level Digital Right Management system using the user authentication information, wherein the encrypting section may encrypt the user authentication information as the security information.

According to another aspect of the invention, the encrypting section may encrypt identifying information to specify a key to open the protected digital content, and the digital content processing section may add the information of the encrypted identifying information to the protected digital content.

According to another aspect of the invention, the device may further include a ticket acquiring section that acquires an electronic ticket to decrypt the security information from the lower level Digital Right Management system, wherein the encrypting section may encrypt the electronic ticket for the protected digital content as the security information.

According to another aspect of the invention, information of right granted to a user regarding the protected digital content may be encrypted together with the security information.

According to another aspect of the invention, the protected digital content and the encrypted security information may be combined to generate data to be distributed to a user.

According to another aspect of the invention, there is provided a device for processing data including protected digital content and security information which protect the digital content, the security information is encrypted. The device includes: an information obtaining section that obtains the encrypted security information; an electronic ticket acquiring section that acquires an electronic ticket to decrypt the encrypted security information from a Digital Right Management system; a decrypting section that decrypts the encrypted information using the electronic ticket to obtain the security information; and a processing section that processes the digital content using the decoded security information.

According to another aspect of the invention, the digital content may be protected by application software having a digital content protecting function.

According to another aspect of the invention, the security information may be a password used for protection of the digital content by the application software.

According to another aspect of the invention, the security information may be added to the protected digital content as property information, an information obtaining section may obtain the encrypted security information from the property information of the protected digital content, and the decrypting section decrypts the encrypted information using the electronic ticket.

According to another aspect of the invention, the digital content may be protected by a lower level Digital Right Management system which is different from the Digital Right Management system.

According to another aspect of the invention, the security information may be user authentication information for the lower level Digital Right Management system, the decrypting section may decrypt the encrypted user authentication information using the electronic ticket and send the decrypted user authentication information to the lower level Digital Right Management system, and when the user authentication is succeeded, the processing section processes the digital content according to the authentication.

According to another aspect of the invention, the security information may be a key identifier to specify a second electronic ticket to open the protected digital content, and the processing section may obtains the key identifier as the decoded security information, acquire the second electronic ticket from the lower Digital Right Management system using the key identifier, and open the protected digital content using the second electronic ticket.

According to another aspect of the invention, the security information may be a second electronic ticket of the lower Digital Right Management system to open the protected digital content, and the processing section may obtain the second electronic ticket as the decoded security information, and open the protected digital content using the second electronic ticket.

According to another aspect of the invention, the encrypted information may include information of right granted to a user regarding the protected digital content, and what the user can do to the content may be based on the information of the right.

According to another aspect of the invention, there is provided a method for protecting digital content. The method includes: causing a digital content to be protected using security information, and encrypting the security information, using a key acquired from a Digital Right Management system of an electronic ticket system.

According to another aspect of the invention, the digital content may be protected by application software having a digital content protecting function.

According to another aspect of the invention, the method may further include producing a password used for protection of the digital content by the application software, wherein the application software may be caused to protect the digital content using the password, and the password is encrypted as the security information.

According to another aspect of the invention, the encrypted security information may be added to the digital content as property information.

According to another aspect of the invention, the digital content may be protected by a lower level Digital Right Management system which is different from the Digital Right Management system.

According to another aspect of the invention, the method may further include: generating user authentication information for the lower level Digital Right Management system; setting right regarding the protected digital content in the lower level Digital Right Management system using the user authentication information; and encrypting the user authentication information as the security information.

According to another aspect of the invention, the method may further include: encrypting information to specify a key to decrypt the encrypted security information; and adding the encrypted identifying information to the protected digital content.

According to another aspect of the invention, the method may further include: acquiring an electronic ticket to decrypt the security information from the lower level Digital Right Management system; and encrypting the electronic ticket for the protected digital content as the security information.

According to another aspect of the invention, information of right granted to a user regarding the protected digital content may be encrypted together with the security information.

According to another aspect of the invention, the protected digital content and the encrypted security information may be combined to generate data to be distributed to a user.

According to another aspect of the invention, there is provided a method for processing data including protected digital content and security information which protect the digital content, the security information is encrypted. The method includes: obtaining the encrypted security information; acquiring an electronic ticket to decrypt the encrypted security information from a Digital Right Management system; decrypting the encrypted information using the electronic ticket to obtain the security information; and processing the digital content using the decoded security information.

According to another aspect of the invention, the digital content may be protected by application software having a digital content protecting function.

According to another aspect of the invention, the security information may be a password used for protection of the digital content by the application software.

According to another aspect of the invention, the security information may be added to the protected digital content as property information; and the method may further include: obtaining the encrypted security information from the property information of the protected digital content; and decrypting the encrypted information using the electronic ticket.

According to another aspect of the invention, the digital content may be protected by a lower level Digital Right Management system which is different from the Digital Right Management system.

According to another aspect of the invention, the security information may be user authentication information for the lower level Digital Right Management system, the method may further include: decrypting the encrypted user authentication information using the electronic ticket, sending the user authentication information to the lower level Digital Right Management system, and when the user authentication is succeeded, processing the digital content according to the authentication.

According to another aspect of the invention, the security information may be a key identifier to specify a second electronic ticket to open the protected digital content, and the method may further include: obtaining the key identifier as the decoded security information, acquiring the second electronic ticket from the lower Digital Right Management system using the key identifier, and opening the protected digital content using the second electronic ticket.

According to another aspect of the invention, the security information may be a second electronic ticket of the lower Digital Right Management system to open the protected digital content, and the method may further include: obtaining the second electronic ticket as the decoded security information, and opening the protected digital content using the second electronic ticket.

According to another aspect of the invention, the encrypted information may include information of right granted to a user regarding the protected digital content, and what the user can do to the content may be based on the information of the right.

According to another aspect of the invention, there is provided a storage medium readable by a computer, the storage medium storing a program of instructions executable by the computer to cause the computer to perform a function. The function includes: causing a digital content to be protected using security information, and encrypting the security information, using a key acquired from a Digital Right Management system of an electronic ticket system.

According to another aspect of the invention, the digital content may be protected by application software having a digital content protecting function.

According to another aspect of the invention, the function may further include: producing a password used for protection of the digital content by the application software; wherein the application software may be caused to protect the digital content using the password, and the password may be encrypted as the security information.

According to another aspect of the invention, the encrypted security information may be added to the digital content as property information.

According to another aspect of the invention, the digital content may be protected by a lower level Digital Right Management system which is different from the Digital Right Management system.

According to another aspect of the invention, the function may further include: generating user authentication information for the lower level Digital Right Management system; setting right regarding the protected digital content in the lower level Digital Right Management system using the user authentication information; and encrypting the user authentication information as the security information.

According to another aspect of the invention, the function may further include: encrypting identifying information to specify a key to open the protected digital content; and adding the encrypted identifying information to the protected digital content.

According to another aspect of the invention, the function may further include: acquiring an electronic ticket to decrypt the security information from the lower level Digital Right Management system; and encrypting the electronic ticket for the protected digital content as the security information.

According to another aspect of the invention, information of right granted to a user regarding the protected digital content may be encrypted together with the security information.

According to another aspect of the invention, the protected digital content and the encrypted security information may be combined to generate data to be distributed to a user.

According to another aspect of the invention, there is provided a storage medium for processing data including protected digital content and security information which protect the digital content, the security information is encrypted. The storage medium stores a program of instructions executable by the computer to cause the computer to perform a function. The function includes: obtaining the encrypted security information; acquiring an electronic ticket to decrypt the encrypted security information from a Digital Right Management system; decrypting the encrypted information using the electronic ticket to obtain the security information; and processing the digital content using the decoded security information.

According to another aspect of the invention, the digital content may be protected by application software having a digital content protecting function.

According to another aspect of the invention, the security information may be a password used for protection of the digital content by the application software.

According to another aspect of the invention, the security information may be added to the protected digital content as property information; and the function may further include: obtaining the encrypted security information from the property information of the protected digital content; and decrypting the encrypted information using the electronic ticket.

According to another aspect of the invention, the digital content may be protected by a lower level Digital Right Management system which is different from the Digital Right Management system.

According to another aspect of the invention, the security information may be user authentication information for the lower level Digital Right Management system, the function may further include: decrypting the encrypted user authentication information using the electronic ticket, sending the user authentication information to the lower level Digital Right Management system, and when the user authentication is succeeded, processing the digital content according to the authentication.

According to another aspect of the invention, the security information may be a key identifier to specify a second electronic ticket to open the protected digital content, and the function may further include: obtaining the key identifier as the decoded security information, acquiring the second electronic ticket from the lower Digital Right Management system using the key identifier, and opening the protected digital content using the second electronic ticket.

According to another aspect of the invention, the security information may be a second electronic ticket of the lower Digital Right Management system to open the protected digital content, and the function may further include: obtaining the second electronic ticket as the decoded security information, and opening the protected digital content using the second electronic ticket.

According to another aspect of the invention, the encrypted information may include information of right granted to a user regarding the protected digital content, and what the user can do to the content may be based on the information of the right.

The full disclosure of Japanese Patent Application No. 2005-161201 filed on Jun. 1, 2005, including the specification, claims, drawings and abstract, is incorporated herein by reference in its entirety.

What is claimed is:

1. A system for protecting a digital content, comprising:
an electronic digital content processing device that causes a digital content to be protected using security information;
an electronic encrypting device that encrypts the security information, using a key acquired from a Digital Right Management system of an electronic ticket system;
a registering device that registers, in the Digital Right Management system, an issuing condition for issuing an electronic ticket for the digital content, the issuing condition being associated with the acquired key;
said electronic digital content processing device causing a lower level Digital Right Management system which is different from the Digital Right Management system to protect the digital content;
an electronic user authentication information generating device that generates user authentication information for the lower level Digital Right Management system; and
a device that sets right regarding the protected digital content in the lower level Digital Right Management system using the user authentication information;
said electronic encrypting device encrypting the user authentication information as the security information.

2. The system according to claim 1, wherein the digital content processing device causes application software having a digital content protecting function to protect the digital content.

3. The system according to claim 2, further comprising an electronic password producing device that produces a password used for protection of the digital content by the application software, wherein the application software is caused to protect the digital content using the password, and the encrypting device encrypts the password as the security information.

4. The system according to claim 3, wherein the encrypted information is added to the digital content as property information.

5. The system according to claim 1, wherein the encrypting device encrypts identifying information to specify a key to open the protected digital content, and the digital content processing device adds the information of the encrypted identifying information to the protected digital content.

6. The system according to claim 1, further comprising a ticket acquiring device that acquires an electronic ticket to decrypt the security information from the lower level Digital Right Management system, wherein the encrypting device encrypts the electronic ticket for the protected digital content as the security information.

7. The system according to claim 1, wherein information of right granted to a user regarding the protected digital content is encrypted together with the security information.

8. The system according to claim 1, wherein the protected digital content and the encrypted security information are combined to generate data to be distributed to a user.

9. A system for processing data including protected digital content and security information which protect the digital content, the security information is encrypted, comprising:

an electronic information obtaining device that obtains the encrypted security information;

an electronic device that sends a content ID or a key ID, the content ID or key ID being included in the protected digital content, to a Digital Right Management system, and receives authentication as to whether an issuing condition stored in association with the content ID or the key ID in the Digital Right Management system is satisfied, the digital content being protected by a lower level Digital Right Management system which is different from the Digital Right Management system;

an electronic ticket acquiring device that acquires an electronic ticket associated with the content ID or the key ID to decrypt the encrypted security information from a Digital Right Management system when the Digital Right Management system determines that the issuing condition is satisfied;

an electronic decrypting device that decrypts the encrypted information using the electronic ticket to obtain the security information; and an electronic processing device that processes the digital content using the decoded security information;

wherein the security information is a second electronic ticket of the lower Digital Right Management system to open the protected digital content, and the processing device obtains the second electronic ticket as the decoded security information, and opens the protected digital content using the second electronic ticket.

10. The system according to claim 9, wherein the digital content is protected by application software having a digital content protecting function.

11. The system according to claim 10, wherein the security information is a password used for protection of the digital content by the application software.

12. The system according to claim 11, wherein the security information is added to the protected digital content as property information, an information obtaining device obtains the encrypted security information from the property information of the protected digital content, and the decrypting device decrypts the encrypted information using the electronic ticket.

13. The system according to claim 9, wherein the security information is user authentication information for the lower level Digital Right Management system, the decrypting device decrypts the encrypted user authentication information using the electronic ticket and sends the decrypted user authentication information to the lower level Digital Right Management system, and when the user authentication is succeeded, the processing device processes the digital content according to the authentication.

14. The system according to claim 9, wherein the security information is a key identifier to specify a second electronic ticket to open the protected digital content, and the processing device obtains the key identifier as the decoded security information, acquires the second electronic ticket from the lower Digital Right Management system using the key identifier, and opens the protected digital content using the second electronic ticket.

15. The system according to claim 9, wherein the encrypted information includes information of right granted to a user regarding the protected digital content, and what the user can do to the content is based on the information of the right.

16. A method for protecting digital content, comprising:
causing a digital content to be protected using security information;
electronically encrypting, using a processor, the security information, using a key acquired from a Digital Right Management system of an electronic ticket system, the digital content being protected by a lower level Digital Right Management system which is different from the Digital Right Management system;
registering, in the Digital Right Management system, an issuing condition for issuing an electronic ticket for the digital content, the issuing condition being associated with the acquired key;
acquiring an electronic ticket to decrypt the security information from the lower level Digital Right Management system; and
encrypting the electronic ticket for the protected digital content as the security information.

17. The method according to claim 16, wherein the digital content is protected by application software having a digital content protecting function.

18. The method according to claim 17, further comprising producing a password used for protection of the digital content by the application software, wherein the application software is caused to protect the digital content using the password, and the password is encrypted as the security information.

19. The method according to claim 18, wherein the encrypted security information is added to the digital content as property information.

20. The method according claim 16, further comprising:
generating user authentication information for the lower level Digital Right Management system;
setting right regarding the protected digital content in the lower level Digital Right Management system using the user authentication information; and
encrypting the user authentication information as the security information.

21. The method according to claim 16, further comprising:
encrypting identifying information to specify a key to open the protected digital content; and
adding the encrypted identifying information to the protected digital content.

22. The method according to claim 16, wherein information of right granted to a user regarding the protected digital content is encrypted together with the security information.

23. The method according to claim 16, wherein the protected digital content and the encrypted security information are combined to generate data to be distributed to a user.

24. A method for processing data including protected digital content and security information which protect the digital content, the security information is encrypted, comprising:
obtaining the encrypted security information;
sending a content ID or a key ID, the content ID or key ID being included in the protected digital content, to a Digital Right Management system, the digital content being protected by a lower level Digital Right Management system which is different from the Digital Right Management system;
receiving authentication as to whether an issuing condition stored in association with the content ID or the key ID in the Digital Right Management system is satisfied;
acquiring an electronic ticket associated with the content ID or the key ID to decrypt the encrypted security information from a Digital Right Management system when the Digital Right Management system determines that the issuing condition is satisfied;
electronically decrypting, using a processor, the encrypted information using the electronic ticket to obtain the security information, the security information being a second electronic ticket of the lower Digital Right Management system to open the protected digital content;

processing the digital content using the decoded security information;

obtaining the second electronic ticket as the decoded security information; and opening the protected digital content using the second electronic ticket.

25. The method according to claim 24, wherein the digital content is protected by application software having a digital content protecting function.

26. The method according to claim 24, wherein the security information is a password used for protection of the digital content by the application software.

27. The method according to claim 26, wherein the security information is added to the protected digital content as property information; and the method further comprising:

obtaining the encrypted security information from the property information of the protected digital content; and decrypting the encrypted information using the electronic ticket.

28. The method according to claim 24, wherein the security information is user authentication information for the lower level Digital Right Management system, the method further comprising:

decrypting the encrypted user authentication information using the electronic ticket, sending the user authentication information to the lower level Digital Right Management system, and when the user authentication is succeeded, processing the digital content according to the authentication.

29. The method according to claim 24, wherein the security information is a key identifier to specify a second electronic ticket to open the protected digital content, and the method further comprising:

obtaining the key identifier as the decoded security information, acquiring the second electronic ticket from the lower Digital Right Management system using the key identifier, and opening the protected digital content using the second electronic ticket.

30. The method according to claim 24, wherein the encrypted information includes information of right granted to a user regarding the protected digital content, and what the user can do to the content is based on the information of the right.

31. A non-transitory storage medium readable by a computer, the storage medium storing a program of instructions executable by the computer to cause the computer to perform a function, the function comprising:

causing a digital content to be protected using security information, encrypting the security information, using a key acquired from a Digital Right Management system of an electronic ticket system, the digital content being protected by a lower level Digital Right Management system which is different from the Digital Right Management system;

registering, in the Digital Right Management system, an issuing condition for issuing an electronic ticket for the digital content, the issuing condition being associated with the acquired key;

acquiring an electronic ticket to decrypt the security information from the lower level Digital Right Management system; and encrypting the electronic ticket for the protected digital content as the security information.

32. The non-transitory storage medium according to claim 31, wherein the digital content is protected by application software having a digital content protecting function.

33. The non-transitory storage medium according to claim 32, the function further comprising:

producing a password used for protection of the digital content by the application software;

wherein the application software is caused to protect the digital content using the password, and the password is encrypted as the security information.

34. The non-transitory storage medium according to claim 33, wherein the encrypted security information is added to the digital content as property information.

35. The non-transitory storage medium according claim 31, the function further comprising:

generating user authentication information for the lower level Digital Right Management system;

setting right regarding the protected digital content in the lower level Digital Right Management system using the user authentication information; and encrypting the user authentication information as the security information.

36. The non-transitory storage medium according to claim 31, the function further comprising:

encrypting identifying information to specify a key to open the protected digital content; and adding the encrypted identifying information to the protected digital content.

37. The non-transitory storage medium according to claim 31, wherein information of right granted to a user regarding the protected digital content is encrypted together with the security information.

38. The non-transitory storage medium according to claim 31, wherein the protected digital content and the encrypted security information are combined to generate data to be distributed to a user.

39. A non-transitory storage medium for processing data including protected digital content and security information which protect the digital content, the security information is encrypted, comprising:

obtaining the encrypted security information;

sending a content ID or a key ID, the content ID or key ID being included in the protected digital content, to a Digital Right Management system, the digital content being protected by a lower level Digital Right Management system which is different from the Digital Right Management system;

receiving authentication as to whether an issuing condition stored in association with the content ID or the key ID in the Digital Right Management system is satisfied;

acquiring an electronic ticket associated with the content ID or the key ID to decrypt the encrypted security information from a Digital Right Management system when the Digital Right Management system determines that the issuing condition is satisfied;

decrypting the encrypted information using the electronic ticket to obtain the security information;

processing the digital content using the decoded security information;

obtaining the second electronic ticket as the decoded security information; and opening the protected digital content using the second electronic ticket.

40. The non-transitory storage medium according to claim 39, wherein the digital content is protected by application software having a digital content protecting function.

41. The non-transitory storage medium according to claim 39, wherein the security information is a password used for protection of the digital content by the application software.

42. The non-transitory storage medium according to claim 41, wherein the security information is added to the protected digital content as property information; and the function further comprising:
obtaining the encrypted security information from the property information of the protected digital content; and decrypting the encrypted information using the electronic ticket.

43. The non-transitory storage medium according to claim 39, wherein the security information is user authentication information for the lower level Digital Right Management system, the function further comprising:

decrypting the encrypted user authentication information using the electronic ticket, sending the user authentication information to the lower level Digital Right Management system, and when the user authentication is succeeded, processing the digital content according to the authentication.

44. The non-transitory storage medium according to claim 39, wherein the security information is a key identifier to specify a second electronic ticket to open the protected digital content, and the function further comprising:

obtaining the key identifier as the decoded security information, acquiring the second electronic ticket from the lower Digital Right Management system using the key identifier, and opening the protected digital content using the second electronic ticket.

45. The non-transitory storage medium according to claim 39, wherein the encrypted information includes information of right granted to a user regarding the protected digital content, and what the user can do to the content is based on the information of the right.

* * * * *